US012430264B2

(12) United States Patent
Roberts et al.

(10) Patent No.: US 12,430,264 B2
(45) Date of Patent: Sep. 30, 2025

(54) SELECTIVE CACHE LINE MEMORY ENCRYPTION

(71) Applicant: Micron Technology, Inc., Boise, ID (US)

(72) Inventors: David Andrew Roberts, Wellesley, MA (US); Tony M. Brewer, Plano, TX (US)

(73) Assignee: Micron Technology, Inc., Boise, ID (US)

( * ) Notice: Subject to any disclaimer, the term of this patent is extended or adjusted under 35 U.S.C. 154(b) by 600 days.

(21) Appl. No.: 17/843,571

(22) Filed: Jun. 17, 2022

(65) Prior Publication Data

US 2023/0058668 A1  Feb. 23, 2023

Related U.S. Application Data

(60) Provisional application No. 63/234,335, filed on Aug. 18, 2021.

(51) Int. Cl.
*G06F 12/14* (2006.01)
*G06F 12/0842* (2016.01)

(52) U.S. Cl.
CPC ...... *G06F 12/1408* (2013.01); *G06F 12/0842* (2013.01); *G06F 2212/1052* (2013.01); *G06F 2212/62* (2013.01)

(58) Field of Classification Search
CPC ............. G06F 12/1408; G06F 12/0842; G06F 12/0895; G06F 12/126; G06F 12/123;
(Continued)

(56) References Cited

U.S. PATENT DOCUMENTS 9,298,894 B2 * 3/2016 Boivie .................... G06F 21/72
10,423,541 B1 * 9/2019 Levin .................. G06F 12/1009
(Continued)

FOREIGN PATENT DOCUMENTS

WO    2018034882    2/2018

OTHER PUBLICATIONS

Flautner, Krisztian, "Drowsy Caches: Simple Techniques for Reducing Leakage Power", Proceedings 29th Annual International Symposium on Computer Architecture, (2002), 10 pgs.
(Continued)

*Primary Examiner* — Amare F Tabor
(74) *Attorney, Agent, or Firm* — Schwegman Lundberg & Woessner, P.A.

(57) ABSTRACT

A cache memory can maintain multiple cache lines and each cache line can include a data field, an encryption status attribute, and an encryption key attribute. The encryption status attribute can indicate whether the data field in the corresponding cache line includes encrypted or unencrypted data and the encryption key attribute can include an encryption key identifier for the corresponding cache line. In an example, a cryptographic controller can access keys from a key table to selectively encrypt or unencrypt cache data. Infrequently accessed cache data can be maintained as encrypted data, and more frequently accessed cache data can be maintained as unencrypted data. In some examples, different cache lines in the same cache memory can be maintained as encrypted or unencrypted data, and different cache lines can use respective different encryption keys.

20 Claims, 11 Drawing Sheets

(58) Field of Classification Search
CPC ......... G06F 15/7821; G06F 2212/1024; G06F 2212/1052; G06F 2212/62; G06F 2212/402
USPC ..................................................... 713/193
See application file for complete search history.

(56) References Cited

U.S. PATENT DOCUMENTS

| | | | |
|---|---|---|---|
| 10,585,809 B2 * | 3/2020 | Durham .................. | G06F 21/79 |
| 10,691,620 B2 * | 6/2020 | Lea ...................... | G06F 12/1009 |
| 11,263,141 B2 * | 3/2022 | Appu .................. | G06F 12/0848 |
| 2003/0065933 A1 * | 4/2003 | Hashimoto ........... | G06F 21/126 |
| | | | 713/194 |
| 2003/0091186 A1 | 5/2003 | Fontijn et al. | |
| 2007/0245160 A1 | 10/2007 | Benhase et al. | |
| 2015/0212951 A1 | 7/2015 | Franceschini et al. | |
| 2015/0294123 A1 * | 10/2015 | Oxford ................ | H04L 63/061 |
| | | | 713/193 |
| 2022/0222384 A1 * | 7/2022 | Hulton ................ | G06F 13/1668 |

OTHER PUBLICATIONS

"International Application Serial No. PCT US2022 034048, International Search Report mailed Oct. 14, 2022", 4 pages.
"International Application Serial No. PCT US2022 034048, Written Opinion mailed Oct. 14, 2022", 5 pages.

* cited by examiner

SELECTIVE CACHE LINE MEMORY ENCRYPTION

PRIORITY APPLICATION

This application claims the benefit of priority to U.S. Provisional Application Ser. No. 63/234,335, filed Aug. 18, 2021, which is incorporated herein by reference in its entirety.

GOVERNMENT RIGHTS

This invention was made with U.S. Government support under Agreement No. DE-AC05-76RL01830, awarded by the Pacific Northwest National Laboratory. The U.S. Government has certain rights in the invention.

BACKGROUND

Various computer architectures, such as the Von Neumann architecture, conventionally use a shared memory for data, a bus for accessing the shared memory, an arithmetic unit, and a program control unit. However, moving data between processors and memory can require significant time and energy, which in turn can constrain performance and capacity of computer systems. In view of these limitations, new computing architectures and devices are desired to advance computing performance beyond the practice of transistor scaling (i.e., Moore's Law).

Some architectures that include or use integrated processor cores include embedded memory, such as can include one or more cache memories. In some examples, a cache can be shared between processors cores, and peripheral interfaces with memory control devices.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Recent advances in materials, devices, and integration technology, can be leveraged to provide memory-centric compute topologies. Such topologies can realize advances in compute efficiency and workload throughput, for example, for applications constrained by size, weight, or power requirements. The topologies can be used to facilitate low-latency compute near, or inside of, memory or other data storage elements. The approaches can be particularly well-suited for various compute-intensive operations with sparse lookups, such as in transform computations (e.g., fast Fourier transform computations (FFT)), or in applications such as neural networks or artificial intelligence (AI), financial analytics, or simulations or modeling such as for computational fluid dynamics (CFD), Enhanced Acoustic Simulator for Engineers (EASE), Simulation Program with Integrated Circuit Emphasis (SPICE), and others.

Systems, devices, and methods discussed herein can include or use memory-compute systems with processors, or processing capabilities, that are provided in, near, or integrated with memory or data storage components. Such systems are referred to generally herein as compute-near-memory (CNM) systems. A CNM system can be a node-based system with individual nodes in the systems coupled using a system scale fabric. Each node can include or use specialized or general-purpose processors, and user-accessible accelerators, with a custom compute fabric to facilitate intensive operations.

In an example, each node in a CNM system can have a host processor or processors. Within each node, a dedicated hybrid threading processor can occupy a discrete endpoint of an on-chip network. The hybrid threading processor can have access to some or all of the memory in a particular node of the system, or a hybrid threading processor can have access to memories across a network of multiple nodes via the system scale fabric. The custom compute fabric, or hybrid threading fabric (HTF), at each node can have its own processor(s) or accelerator(s) or memory(ies) and can operate at higher bandwidth than the hybrid threading processor. Different nodes in a compute-near-memory system can be differently configured, such as having different compute capabilities, different types of memories, different interfaces, different security or encryption capabilities or requirements, or other differences. In an example, the nodes can be commonly coupled to share data and compute resources within a defined address space.

Figure 10A:
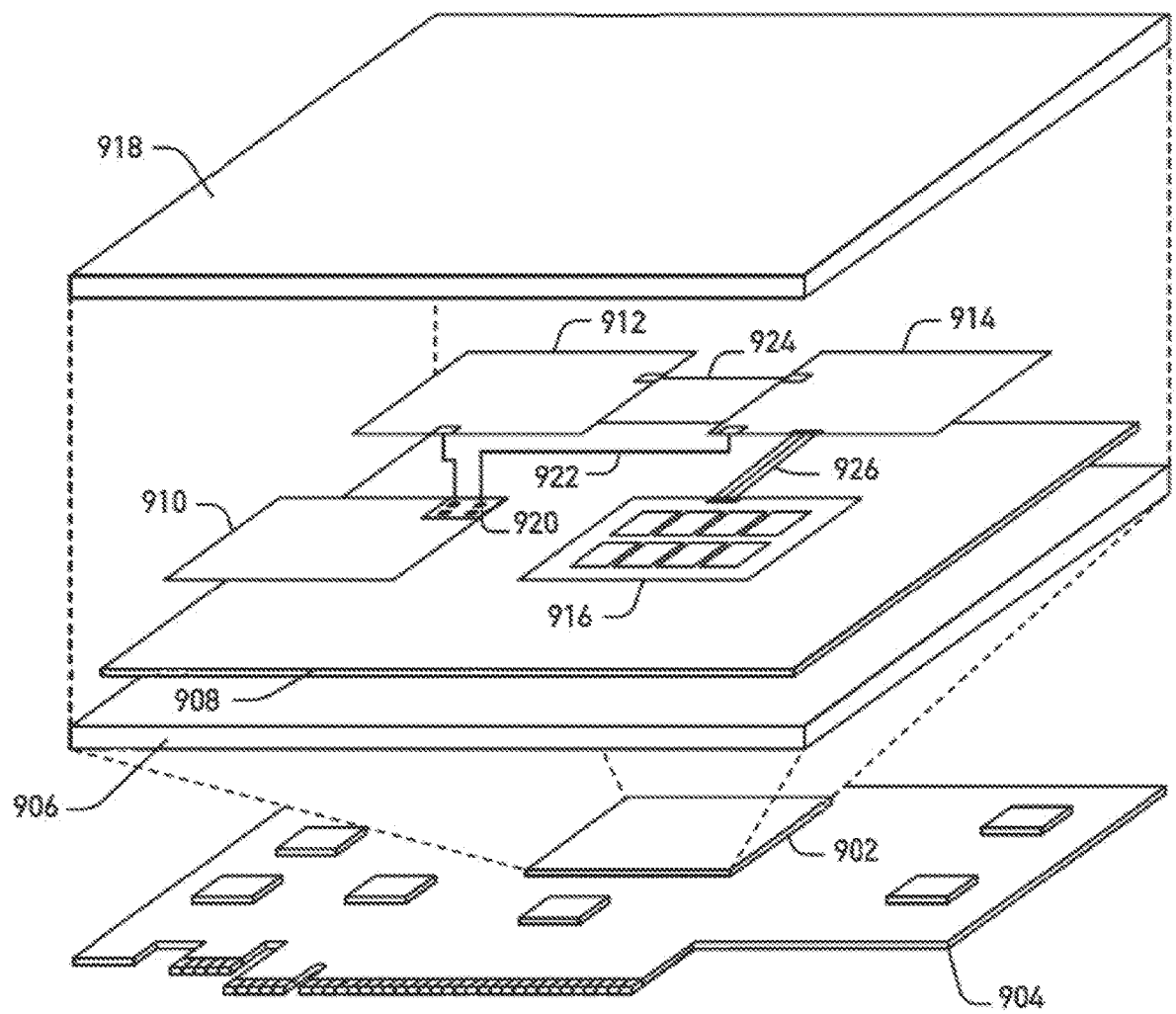
FIG. 10A illustrates generally an example of a chiplet system, according to an embodiment.
Figure 10B:
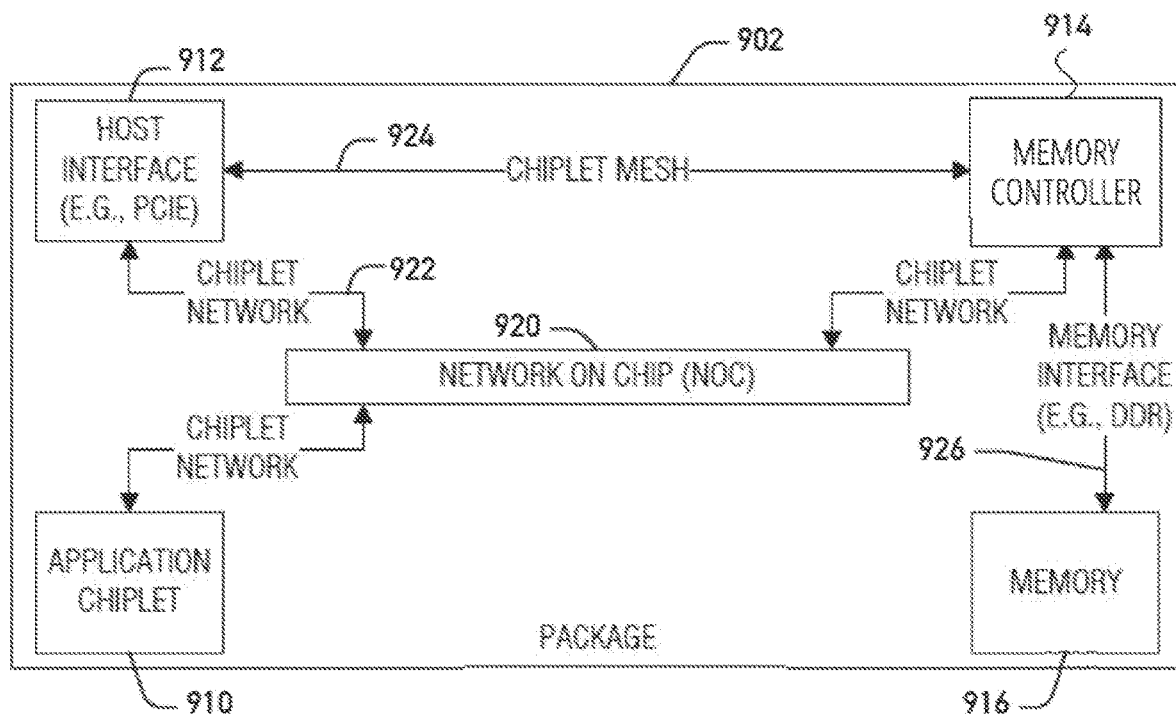
FIG. 10B illustrates generally a block diagram showing various components in the chiplet system from the example of FIG. 10A.

A compute-near-memory system, or nodes or tiles of a compute-near-memory system, can include or use various memory devices, controllers, and interconnects, among other things. In an example, the system can comprise various interconnected nodes and the nodes, or groups of nodes, can be implemented using chiplets. Chiplets are an emerging technique for integrating various processing functionality. Generally, a chiplet system is made up of discrete chips (e.g., integrated circuits (ICs) on different substrate or die) that are integrated on an interposer and packaged together. This arrangement is distinct from single chips (e.g., ICs) that contain distinct device blocks (e.g., intellectual property (IP) blocks) on one substrate (e.g., single die), such as a system-on-a-chip (SoC), or discretely packaged devices integrated on a board. In general, chiplets provide production benefits over single-die chips, including higher yields or reduced development costs. FIG. 10A and FIG. 10B, discussed below, illustrate generally an example of a chiplet system such as can comprise a compute-near-memory system, memory controller, memory subsystem, or other components of or appurtenant to a memory system.

Systems, such as including compute-near-memory systems, can use data or memory encryption to help protect information from unwanted use or observation. Encryption can help avoid data observation by other systems or actors who impermissibly gain access to a physical (e.g., non-volatile) memory device or to a system or a virtual machine having shared memory. In some cases, different encryption keys can be used to enhance security, such as different keys for respective different regions of data or for different virtual machines.

Maintaining data in encrypted form can introduce latency or degrade performance because, generally, encrypted data is deciphered or unencrypted before it is used in processing. The present inventors have recognized, among other things, that a problem to be solved can thus include balancing the competing interests of data security and performance.

The inventors have further recognized that in-memory, or near-memory, or other compute systems can generally use data in an unencrypted form (sometimes referred to herein as "plaintext") for processing. Such processing systems can include buffers or caches to temporarily store data that is frequently used. However, since encryption and decryption operations can be time consuming and add processing latency, it can be preferable to store cached data as unencrypted data or plaintext to facilitate low-latency operation. Data stored as plaintext, however, can reduce the security of the data. In an example, a solution to these and other problems can include or use a flexible memory encryption and decryption system that allows some, all, or none of cached data to be encrypted. The solution can further include controlling, manually or automatically, which cached data is stored as encrypted data and which is stored as unencrypted data. In an example, the selective memory encryption systems and methods can be applied or used in various processor caches, including for a CPU, GPU, FPGA, or other accelerator or device.

Figure 1:
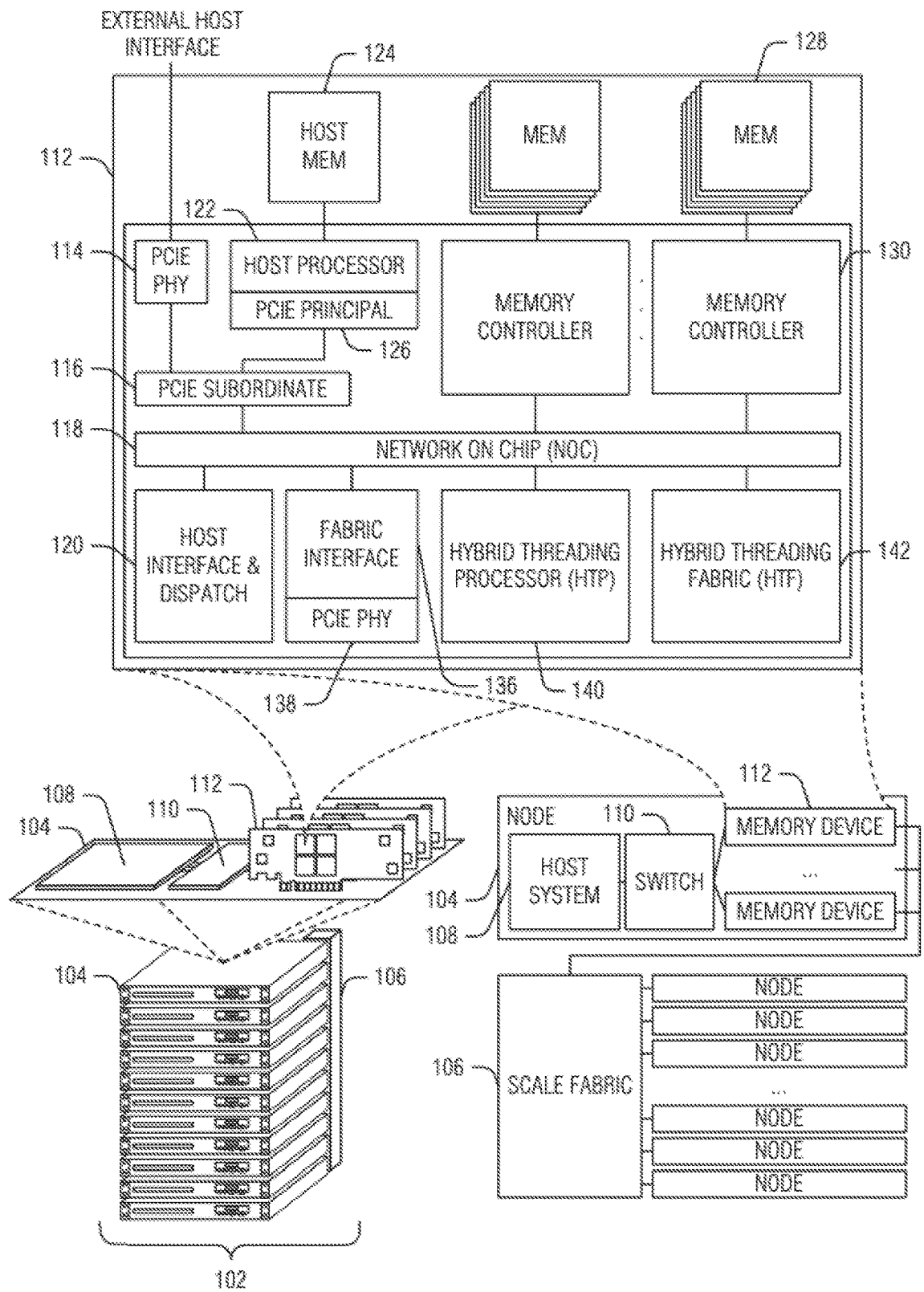
FIG. 1 illustrates generally a first example of a first memory-compute device in the context of a memory-compute system, according to an embodiment.

FIG. 1 illustrates generally a first example of a compute-near-memory system, or CNM system 102. The example of the CNM system 102 includes multiple different memory-compute nodes, such as can each include various compute-near-memory devices. Each node in the system can operate in its own operating system (OS) domain (e.g., Linux, among others). In an example, the nodes can exist collectively in a common OS domain of the CNM system 102.

The example of FIG. 1 includes an example of a first memory-compute node 104 of the CNM system 102. The CNM system 102 can have multiple nodes, such as including different instances of the first memory-compute node 104, that are coupled using a scale fabric 106. In an example, the architecture of the CNM system 102 can support scaling with up to n different memory-compute nodes (e.g., n=4096) using the scale fabric 106. As further discussed below, each node in the CNM system 102 can be an assembly of multiple devices.

The CNM system 102 can include a global controller for the various nodes in the system, or a particular memory-compute node in the system can optionally serve as a host or controller to one or multiple other memory-compute nodes in the same system. The various nodes in the CNM system 102 can thus be similarly or differently configured.

In an example, each node in the CNM system 102 can comprise a host system that uses a specified operating system. The operating system can be common or different among the various nodes in the CNM system 102. In the example of FIG. 1, the first memory-compute node 104 comprises a host system 108, a first switch 110, and a first memory-compute device 112. The host system 108 can comprise a processor, such as can include an X86, ARM, RISC-V, or other type of processor. The first switch 110 can be configured to facilitate communication between or among devices of the first memory-compute node 104 or of the CNM system 102, such as using a specialized or other communication protocol, generally referred to herein as a chip-to-chip protocol interface (CTCPI). That is, the CTCPI can include a specialized interface that is unique to the CNM system 102, or can include or use other interfaces such as the compute express link (CXL) interface, the peripheral component interconnect express (PCIe) interface, or the chiplet protocol interface (CPI), among others. The first switch 110 can include a switch configured to use the CTCPI. For example, the first switch 110 can include a CXL switch, a PCIe switch, a CPI switch, or other type of switch. In an example, the first switch 110 can be configured to couple differently configured endpoints. For example, the first switch 110 can be configured to convert packet formats, such as between PCIe and CPI formats, among others.

The CNM system 102 is described herein in various example configurations, such as comprising a system of nodes, and each node can comprise various chips (e.g., a processor, a switch, a memory device, etc.). In an example, the first memory-compute node 104 in the CNM system 102 can include various chips implemented using chiplets. In the below-discussed chiplet-based configuration of the CNM system 102, inter-chiplet communications, as well as additional communications within the system, can use a CPI network. The CPI network described herein is an example of the CTCPI, that is, as a chiplet-specific implementation of the CTCPI. As a result, the below-described structure, operations, and functionality of CPI can apply equally to structures, operations, and functions as may be otherwise implemented using non-chiplet-based CTCPI implementations. Unless expressly indicated otherwise, any discussion herein of CPI applies equally to CTCPI.

A CPI interface includes a packet-based network that supports virtual channels to enable a flexible and high-speed interaction between chiplets, such as can comprise portions of the first memory-compute node 104 or the CNM system 102. The CPI can enable bridging from intra-chiplet networks to a broader chiplet network. For example, the Advanced eXtensible Interface (AXI) is a specification for intra-chip communications. AXI specifications, however, cover a variety of physical design options, such as the number of physical channels, signal timing, power, etc. Within a single chip, these options are generally selected to meet design goals, such as power consumption, speed, etc. However, to achieve the flexibility of a chiplet-based memory-compute system, an adapter, such as using CPI, can interface between the various AXI design options that can be implemented in the various chiplets. By enabling a physical channel-to-virtual channel mapping and encapsulating time-based signaling with a packetized protocol, CPI can be used to bridge intra-chiplet networks, such as within a particular memory-compute node, across a broader chiplet network, such as across the first memory-compute node 104 or across the CNM system 102.

The CNM system 102 is scalable to include multiple-node configurations. That is, multiple different instances of the first memory-compute node 104, or of other differently configured memory-compute nodes, can be coupled using the scale fabric 106, to provide a scaled system. Each of the memory-compute nodes can run its own operating system and can be configured to jointly coordinate system-wide resource usage.

In the example of FIG. 1, the first switch 110 of the first memory-compute node 104 is coupled to the scale fabric 106. The scale fabric 106 can provide a switch (e.g., a CTCPI switch, a PCIe switch, a CPI switch, or other switch) that can facilitate communication among and between different memory-compute nodes. In an example, the scale fabric 106 can help various nodes communicate in a partitioned global address space (PGAS).

In an example, the first switch 110 from the first memory-compute node 104 is coupled to one or multiple different memory-compute devices, such as including the first memory-compute device 112. The first memory-compute device 112 can comprise a chiplet-based architecture referred to herein as a compute-near-memory (CNM) chiplet. A packaged version of the first memory-compute device 112 can include, for example, one or multiple CNM chiplets. The chiplets can be communicatively coupled using CTCPI for high bandwidth and low latency.

In the example of FIG. 1, the first memory-compute device 112 can include a network on chip (NOC) or first NOC 118. Generally, a NOC is an interconnection network within a device, connecting a particular set of endpoints. In FIG. 1, the first NOC 118 can provide communications and connectivity between the various memory, compute resources, and ports of the first memory-compute device 112.

In an example, the first NOC 118 can comprise a folded Clos topology, such as within each instance of a memory-compute device, or as a mesh that couples multiple memory-compute devices in a node. The Clos topology, such as can use multiple, smaller radix crossbars to provide functionality associated with a higher radix crossbar topology, offers various benefits. For example, the Clos topology can exhibit consistent latency and bisection bandwidth across the NOC.

The first NOC 118 can include various distinct switch types including hub switches, edge switches, and endpoint switches. Each of the switches can be constructed as crossbars that provide substantially uniform latency and bandwidth between input and output nodes. In an example, the endpoint switches and the edge switches can include two separate crossbars, one for traffic headed to the hub switches, and the other for traffic headed away from the hub switches. The hub switches can be constructed as a single crossbar that switches all inputs to all outputs.

In an example, the hub switches can have multiple ports each (e.g., four or six ports each), such as depending on whether the particular hub switch participates in inter-chip communications. A number of hub switches that participates in inter-chip communications can be set by an inter-chip bandwidth requirement.

The first NOC 118 can support various payloads (e.g., from 8 to 64-byte payloads; other payload sizes can similarly be used) between compute elements and memory. In an example, the first NOC 118 can be optimized for relatively smaller payloads (e.g., 8-16 bytes) to efficiently handle access to sparse data structures.

In an example, the first NOC 118 can be coupled to an external host via a first physical-layer interface 114, a PCIe subordinate module 116 or endpoint, and a PCIe principal module 126 or root port. That is, the first physical-layer interface 114 can include an interface to allow an external host processor to be coupled to the first memory-compute device 112. An external host processor can optionally be coupled to one or multiple different memory-compute devices, such as using a PCIe switch or other, native protocol switch. Communication with the external host processor through a PCIe-based switch can limit device-to-device communication to that supported by the switch. Communication through a memory-compute device-native protocol switch such as using CTCPI, in contrast, can allow for more full communication between or among different memory-compute devices, including support for a partitioned global address space, such as for creating threads of work and sending events.

In an example, the CTCPI protocol can be used by the first NOC 118 in the first memory-compute device 112, and the first switch 110 can include a CTCPI switch. The CTCPI switch can allow CTCPI packets to be transferred from a source memory-compute device, such as the first memory-compute device 112, to a different, destination memory-compute device (e.g., on the same or other node), such as without being converted to another packet format.

In an example, the first memory-compute device 112 can include an internal host processor 122. The internal host processor 122 can be configured to communicate with the first NOC 118 or other components or modules of the first memory-compute device 112, for example, using the internal PCIe principal module 126, which can help eliminate a physical layer that would consume time and energy. In an example, the internal host processor 122 can be based on a RISC-V ISA processor, and can use the first physical-layer interface 114 to communicate outside of the first memory-compute device 112, such as to other storage, networking, or other peripherals to the first memory-compute device 112. The internal host processor 122 can control the first memory-compute device 112 and can act as a proxy for operating system-related functionality. The internal host processor 122 can include a relatively small number of processing cores (e.g., 2-4 cores) and a host memory device 124 (e.g., comprising a DRAM module).

In an example, the internal host processor 122 can include PCI root ports. When the internal host processor 122 is in use, then one of its root ports can be connected to the PCIe subordinate module 116. Another of the root ports of the internal host processor 122 can be connected to the first physical-layer interface 114, such as to provide communication with external PCI peripherals. When the internal host processor 122 is disabled, then the PCIe subordinate module 116 can be coupled to the first physical-layer interface 114 to allow an external host processor to communicate with the first NOC 118. In an example of a system with multiple memory-compute devices, the first memory-compute device 112 can be configured to act as a system host or controller. In this example, the internal host processor 122 can be in use, and other instances of internal host processors in the respective other memory-compute devices can be disabled.

The internal host processor 122 can be configured at power-up of the first memory-compute device 112, such as to allow the host to initialize. In an example, the internal host processor 122 and its associated data paths (e.g., including the first physical-layer interface 114, the PCIe subordinate module 116, etc.) can be configured from input pins to the first memory-compute device 112. One or more of the pins can be used to enable or disable the internal host processor 122 and configure the PCI (or other) data paths accordingly.

In an example, the first NOC 118 can be coupled to the scale fabric 106 via a scale fabric interface module 136 and a second physical-layer interface 138. The scale fabric interface module 136, or SIF, can facilitate communication between the first memory-compute device 112 and a device space, such as a partitioned global address space (PGAS). The PGAS can be configured such that a particular memory-compute device, such as the first memory-compute device 112, can access memory or other resources on a different memory-compute device (e.g., on the same or different node), such as using a load/store paradigm. Various scalable fabric technologies can be used, including CTCPI, CPI, Gen-Z, PCI, or Ethernet bridged over CXL. The scale fabric 106 can be configured to support various packet formats and encryption. In an example, the scale fabric 106 supports orderless packet communications, or supports ordered packets such as can use a path identifier to spread bandwidth across multiple equivalent paths. The scale fabric 106 can generally support remote operations such as remote memory read, write, and other built-in atomics, remote memory atomics, remote memory-compute device send events, and remote memory-compute device call and return operations.

In an example, the first NOC 118 can be coupled to one or multiple different memory modules, such as including a first memory device 128. The first memory device 128 can include various kinds of memory devices, for example, LPDDR5 or GDDR6, among others. In the example of FIG. 1, the first NOC 118 can coordinate communications with the first memory device 128 via a memory controller 130 that can be dedicated to the particular memory module. In an example, the memory controller 130 can include a memory module cache and an atomic operations module. The atomic operations module can be configured to provide relatively high-throughput atomic operators, such as including integer and floating-point operators. The atomic operations module can be configured to apply its operators to data within the memory module cache (e.g., comprising SRAM memory side cache), thereby allowing back-to-back atomic operations using the same memory location, with minimal throughput degradation. In an example, some or all of the data in the memory module cache can be stored or maintained in an encrypted form, as further discussed herein.

The memory module cache can provide storage for frequently accessed memory locations, such as without having to re-access the first memory device 128. In an example, the memory module cache can be configured to cache data only for a particular instance of the memory controller 130. In an example, the memory controller 130 includes a DRAM controller configured to interface with the first memory device 128, such as including DRAM devices. The memory controller 130 can provide access scheduling and bit error management, among other functions. In an example, the memory module cache can access an encryption key table that is associated with the particular memory controller 130 or cache, or can access a global table for the node or for the CNM system 102.

In an example, the first NOC 118 can be coupled to a hybrid threading processor (HTP 140), a hybrid threading fabric (HTF 142) and a host interface and dispatch module (HIF 120). The HIF 120 can be configured to facilitate access to host-based command request queues and response queues. In an example, the HIF 120 can dispatch new threads of execution on processor or compute elements of the HTP 140 or the HTF 142. In an example, the HIF 120 can be configured to maintain workload balance across the HTP 140 module and the HTF 142 module.

The hybrid threading processor, or HTP 140, can include an accelerator, such as can be based on a RISC-V instruction set. The HTP 140 can include a highly threaded, event-driven processor in which threads can be executed in single instruction rotation, such as to maintain high instruction throughput. The HTP 140 comprises relatively few custom instructions to support low-overhead threading capabilities, event send/receive, and shared memory atomic operators.

The hybrid threading fabric, or HTF 142, can include an accelerator, such as can include a non-von Neumann, coarse-grained, reconfigurable processor. The HTF 142 can be optimized for high-level language operations and data types (e.g., integer or floating point). In an example, the HTF 142 can support data flow computing. The HTF 142 can be configured to use substantially all of the memory bandwidth available on the first memory-compute device 112, such as when executing memory-bound compute kernels.

Figure 2:
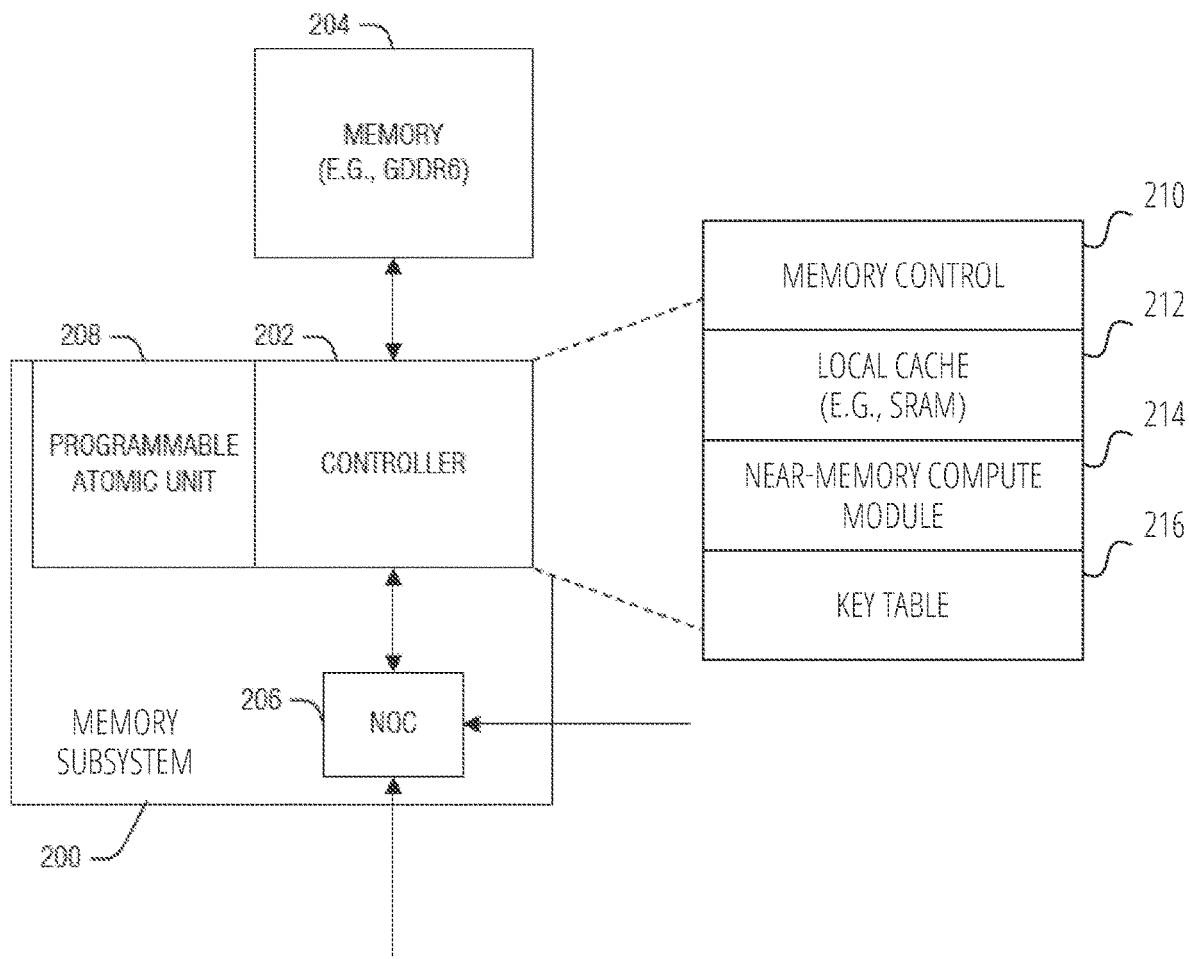
FIG. 2 illustrates generally an example of a memory subsystem portion of a memory-compute device, according to an embodiment.

FIG. 2 illustrates generally an example of a memory subsystem 200 of a memory-compute device, according to an embodiment. The example of the memory subsystem 200 includes a controller 202, a programmable atomic unit 208, and a second NOC 206. The controller 202 can include or use the programmable atomic unit 208 to carry out operations using information in a memory device 204. In an example, the memory subsystem 200 comprises a portion of the first memory-compute device 112 from the example of FIG. 1, such as including portions of the first NOC 118 or of the memory controller 130.

In the example of FIG. 2, the second NOC 206 is coupled to the controller 202 and the controller 202 can include a memory control module 210, a local cache module 212, a near-memory compute module 214, and a key table 216. In an example, the near-memory compute module 214 can be configured to handle relatively simple, single-cycle, integer atomics. The near-memory compute module 214 can perform atomics at the same throughput as, for example, normal memory read or write operations. In an example, an atomic memory operation can include a combination of storing data to the memory, performing an atomic memory operation, and then responding with load data from the memory.

Figure 3:
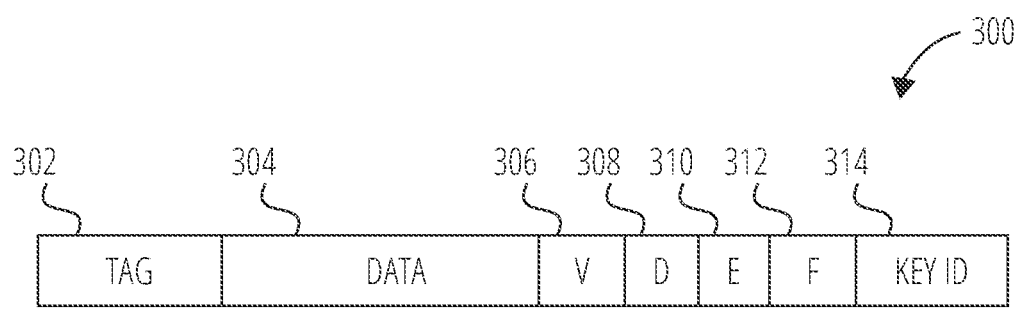
FIG. 3 illustrates generally an example of a cache line structure for a cache memory.

The local cache module 212, such as can include an SRAM cache, can be provided to help reduce latency for repetitively-accessed memory locations. In an example, the local cache module 212 can provide a read buffer for sub-memory line accesses. The local cache module 212 can be particularly beneficial for compute elements that have relatively small or no data caches. In an example, the local cache module 212 comprises multiple cache lines and each line can include encrypted data (ciphertext) or unencrypted data (plaintext) or a combination of separately addressable encrypted and unencrypted data. FIG. 3, discussed below, provides an example of a cache line structure 300 for data or lines in the local cache module 212.

The near-memory compute module 214, such as can include a DRAM controller, can provide low-level request buffering and scheduling, such as to provide efficient access to the memory device 204, such as can include a DRAM device. In an example, the memory device 204 can include or use a GDDR6 DRAM device, such as having 16 Gb density and 64 Gb/sec peak bandwidth. Other devices can similarly be used. In an example, the near-memory compute module 214 comprises cryptographic processing circuitry configured to encrypt or decrypt information that is transferred from, or to, the local cache module 212 or to the memory device 204. For example, the near-memory compute 214 can comprise a portion of the cryptographic memory system 400, such as the cryptographic controller 404 or a cryptographic engine, as further discussed below in the example of FIG. 4.

In an example, the programmable atomic unit 208 can comprise single-cycle or multiple-cycle operators such as can be configured to perform integer addition or more complicated multiple-instruction operations such as bloom filter insert. In an example, the programmable atomic unit 208 can be configured to perform load and store-to-memory operations. The programmable atomic unit 208 can be configured to leverage the RISC-V ISA with a set of specialized instructions to facilitate interactions with the controller 202 to atomically perform user-defined operations.

Programmable atomic requests, such as received from an on-node or off-node host, can be routed to the programmable atomic unit 208 via the second NOC 206 and the controller 202. In an example, custom atomic operations (e.g., carried out by the programmable atomic unit 208) can be identical to built-in atomic operations (e.g., carried out by the near-memory compute module 214) except that a programmable atomic operation can be defined or programmed by the user rather than the system architect. In an example, programmable atomic request packets can be sent through the second NOC 206 to the controller 202, and the controller 202 can identify the request as a custom atomic. The controller 202 can then forward the identified request to the programmable atomic unit 208.

The key table 216 can store information about encryption keys and corresponding key identifiers. In an example, the key table 216 can be populated or programmed by a host device, for example, at start-up.

FIG. 3 illustrates generally an example of a cache line structure 300 for different blocks, or cache lines, that can include encrypted data or unencrypted data. The cache line structure 300 illustrates graphically several different fields that can comprise portions of a cache line; other or additional field can be used.

Generally, a cache can be specified by various attributes includes its size, block or line size, associativity, write policy (e.g., write-through or write-back), and a replacement policy. Cache addresses can be specified by an index and, optionally, an offset. The example cache line structure 300 includes a tag field 302 (TAG) that facilitates translation from a cache address to a particular CPU address. When a CPU or host attempts to access a particular address and a matching cache line is available, then the access is successful and is considered a cache hit. If a matching cache line is not available, then the access is unsuccessful and is considered a cache miss. If there is a cache miss, then the controller can access RAM or other memory to obtain the correct data.

The cache line structure 300 further includes a data field 304 (DATA). The size of the data field 304 can be fixed or variable and can be configured to hold data of various types. In some examples, the data field 304 comprises encrypted data and in other examples the data field 304 comprises unencrypted data. In some examples, the data field 304 comprises a combination of separately addressable encrypted and unencrypted data. That is, the data field 304 can include multiple data stores, and each store can be separately encrypted, such as using the same or different key.

The cache line structure 300 further includes a validity field 306 (V) and a modify field 308 (D). The validity field 306 can include a bit that indicates whether the cache line is used (e.g., whether the cache line includes valid data) or is unused. The modify field 308 can include a bit that indicates whether the cache line includes the same data as in main memory or is modified (sometimes referred to as dirty).

In the example of FIG. 3, the cache line structure 300 further includes an encryption status field 310 (E), an access counter 312 (F), and a key field 314 (KEY ID). In an example, the encryption status field 310 can include one or more bits set to indicate whether information elsewhere in the same cache line (e.g., in the data field 304) is encrypted or unencrypted.

The key field 314 can include an encryption key identifier that is associated with a particular encryption key. In an example, information about keys and corresponding key identifiers can be stored elsewhere, such as in the key table 216 from the example of FIG. 2. The key field 314 can include one or multiple bits of information to address respective different encryption keys in the key table 216. In an example, the key field 314 can include multiple encryption key identifiers that correspond to respective different stores in the data field 304.

Information in the key field 314 can be populated during cache line-fill operations using key identifier information or other metadata stored in main memory. In an example, storage of key identifiers in main memory can occur on corresponding write-back operations or upon eviction of corresponding dirty cache lines.

In another example, a key identifier can be associated with a respective memory address, or addresses, and read or write requests from a host device can include a key identifier. In this example, the key identifier can be removed or separated from the corresponding memory address before the memory is accessed, and the key identifier can be written back to or read from memory during later cache misses, to help ensure the correct key is selected for encryption or decryption.

The access counter 312 can include one or more bits set to indicate a recency or frequency at which the cache line is accessed. In one mode of operation, the access counter 312 can be a counter that is set to a specified initial value (e.g., zero) when a particular cache line is accessed, decrypted, and stored in-place in cache with plaintext data in the data field 304. Then, at each host interval, the counter can be incremented or decremented. For example, the counter can be incremented each time the host interval includes an access request for the particular cache line, or the counter can be decremented for each interval that does not include a request for the particular cache line. Other relationships can similarly be used, for example, to decrement the counter once for each of a specified number of multiple intervals. If the counter reaches a specified threshold condition that indicates the cache line was not recently used, then the data field 304 in the particular cache line can be encrypted.

In an example, alternatively or additionally to using the access counter 312, the cache can comprise a Least Recently Used (LRU) cache that organizes its blocks according to access recency. Any cold (i.e., not recently accessed) or infrequently used cache lines can be indicated for encryption if the data in such lines is unencrypted.

Figure 4:
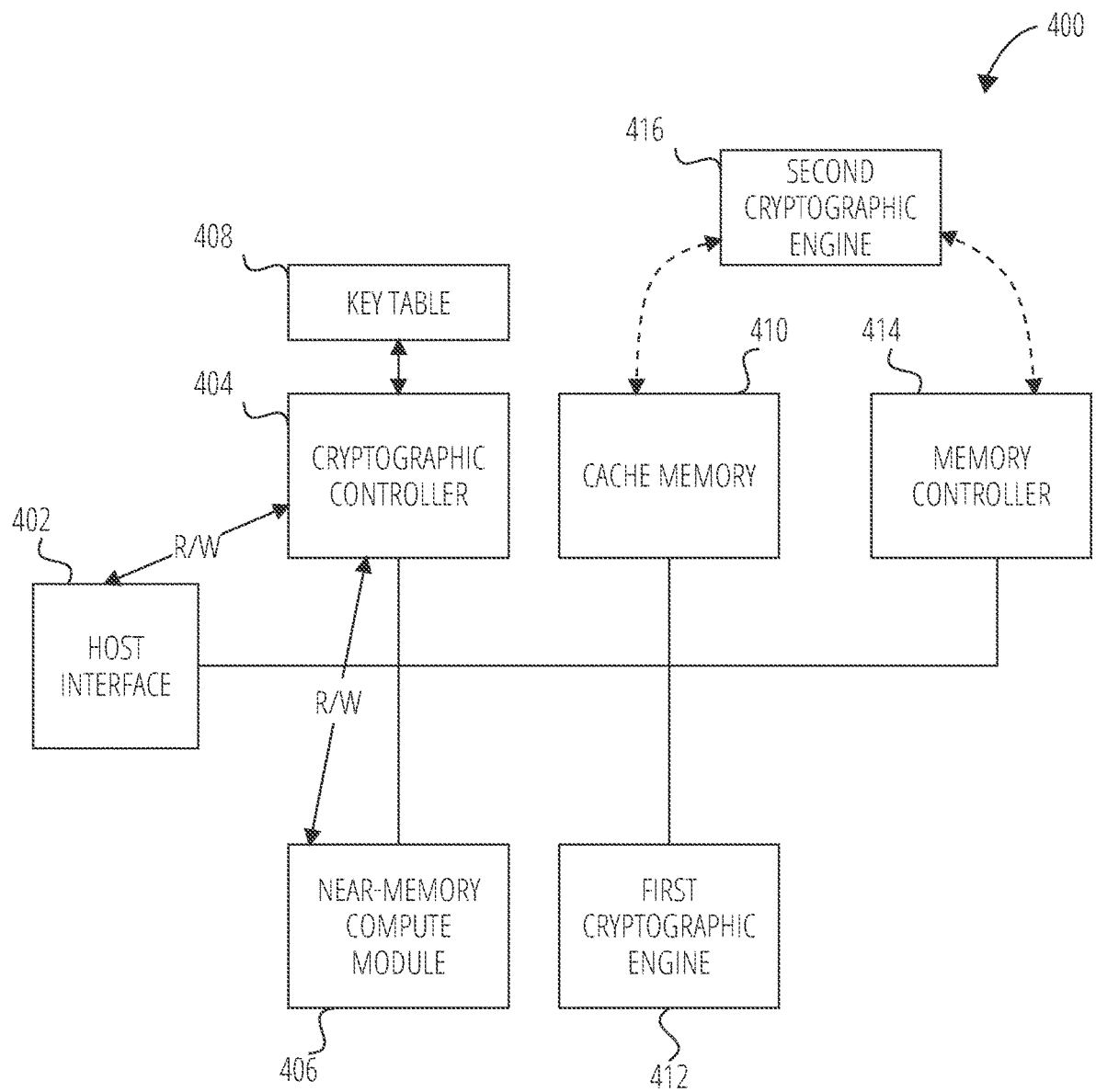
FIG. 4 illustrates generally an example of a cryptographic memory system.

FIG. 4 illustrates generally an example of a cryptographic memory system 400, such as can include or comprise a portion of the memory subsystem 200. The cryptographic memory system 400 includes a host interface 402, a cryptographic controller 404, a near-memory compute module 406, a key table 408, a cache memory 410, a first cryptographic engine 412, a memory controller 414, and optionally includes a second cryptographic engine 416. In the example of FIG. 4, the host interface 402, near-memory compute module 406, cryptographic controller 404, cache memory 410, first cryptographic engine 412, and memory controller 414 can be coupled by a network, such as the second NOC 206. The key table 408 can optionally be decoupled from the NOC and accessible securely by the cryptographic controller 404, or the key table 408 can comprise a portion of the cryptographic controller 404. The cryptographic memory system 400 can be configured to help maintain a relatively large portion of data stored in the cache memory 410 securely encrypted while maintaining low-latency access to frequently requested cache lines.

In an example, the cryptographic controller 404 comprises a cache controller that helps coordinate read and write requests from the host interface 402 or from the near-memory compute module 406. The cryptographic controller 404 can be configured to monitor information in cache lines in the cache memory 410, such as the encryption status field 310 or the access counter 312 or other field, to determine whether a requested cache line includes encrypted or unencrypted data. In an example, the cryptographic controller 404 can be configured to coordinate encryption or decryption of data in a particular cache line of the cache memory 410, and can write back either plaintext or ciphertext, such as together with other attributes associated with the particular cache line. The cryptographic controller 404 can further coordinate write backs to the same cache line location, or to other locations such as in an LRU cache.

In another example, the cryptographic controller 404 can coordinate cache line fill operations to populate the cache memory 410 from, e.g., a main memory or other external memory, such as using the memory controller 414. Data in the main memory can be stored as encrypted data or unencrypted data. A lookup table can optionally be provided, or in-memory metadata can be used, to indicate the encryption status of particular data in the main memory.

In an example, the cryptographic controller 404 is configured to access the key table 408. The key table 408 can include information about correspondence between encryption key identifiers, such as can be stored in the key field 314 of a cache line, and keys configured for use by the first cryptographic engine 412 in performing encryption or decryption. In an example, the cryptographic controller 404 can retrieve a particular key for a particular cache line and pass it to the first cryptographic engine 412 together with data from the same particular cache line.

In an example, the first cryptographic engine 412 can be a cryptography circuit configured to perform encryption or decryption in response to requests from the cryptographic controller 404. In an example, the cryptographic memory system 400 can include the second cryptographic engine 416 to help facilitate or optimize some transactions between the cache memory 410 and main memory, such as via the memory controller 414. For example, the second cryptographic engine 416 can include an encryption circuit configured to encrypt any unencrypted data that is evicted from the cache memory 410. In some examples, the second cryptographic engine 416 can be configured to decrypt data that is received into the cache memory 410 from the main memory.

In an example, the first cryptographic engine 412 and the second cryptographic engine 416 can operate in parallel. Cache line eviction and corresponding encryption processing, such as using the second cryptographic engine 416, can thus be performed concurrently with data encryption or decryption by the first cryptographic engine 412 for ongoing transactions between the cache memory 410 and the host interface 402 or near-memory compute module 406. This configuration with a dedicated engine to process outgoing cache lines can help reduce system latency while maintaining high data security.

In an example, the cryptographic controller 404, the first cryptographic engine 412, or the second cryptographic engine 416, can be configured to use various encryption algorithms, or a combination of algorithms, for encryption or decryption. Examples of encryption algorithms can include or use, among other things, Advanced Encryption Standard (AES) keys, hash keys, whitening keys, Rivest-Shamir-Adleman (RSA), Triple DES, symmetric or asymmetric keys, or others. In some examples, keys can be generated based on a reference key. The reference key can be stored locally in a portion of the cryptographic memory system 400 or externally in, e.g., the host device accessible via the host interface 402 or elsewhere via the NOC.

FIG. 5, FIG. 6, FIG. 7, and FIG. 8 illustrate generally various examples of using the cryptographic memory system 400 or portions thereof to enhance security of data by maintaining some cache contents as encrypted data while selectively decrypting other contents for use. By selectively decrypting cache lines depending on, for example, line access rate or usage, system efficiency can be improved over systems that globally encrypt or decrypt an entire cache before or during use.

Figure 5:
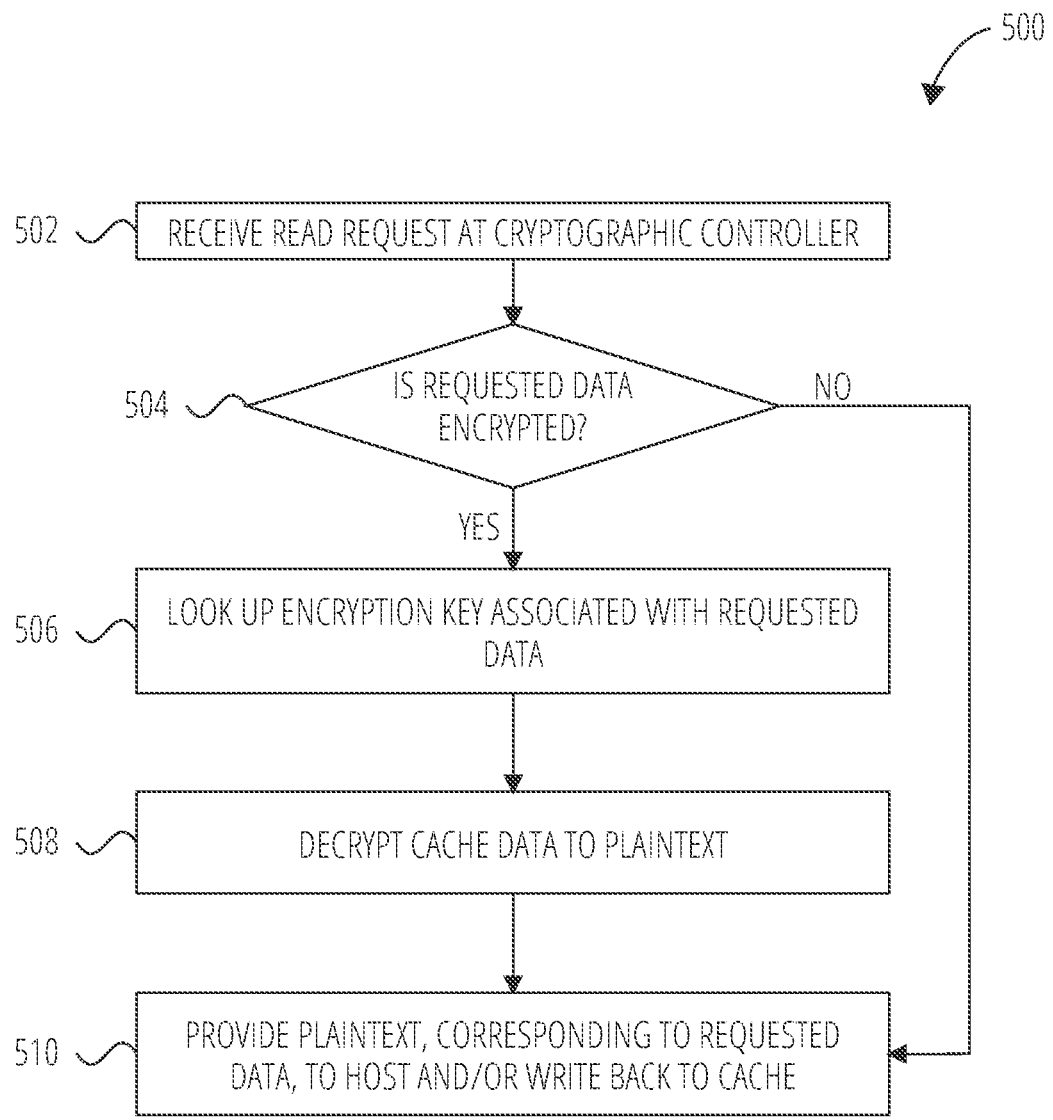
FIG. 5 illustrates generally an example of a cache data read example.

FIG. 5 illustrates generally an example of a cache data read example 500. The cache data read example 500 can include or use various components from the cryptographic memory system 400. At block 502, the cache data read example 500 includes receiving a read request at a cryptographic controller. For example, block 502 can include receiving a request, such as from a host device via the host interface 402, to read particular data, from a particular cache line, in the cache memory 410. In an example, the request from block 502 can be received by the cryptographic controller 404.

At decision block 504, the cryptographic controller 404 can access the requested cache line and determine whether the requested data in the cache line is encrypted or not encrypted. In an example, the cryptographic controller 404 can determine the encryption status of the data using information from the encryption status field 310 in the cache line. For example, the information in the encryption status field 310 can include a binary indication that the data in the cache line is encrypted or is not encrypted. In some examples, the information in the encryption status field 310 can include more than a binary indication about encryption, and can include information about some portion of the data in the cache line that is or is not encrypted.

If, at decision block 504, the cryptographic controller 404 determines that the requested data is not encrypted, then the cache data read example 500 can proceed to block 510. At block 510, the plaintext or unencrypted information, corresponding to the requested data, can be provided to the host that issued the request at block 502, or to another destination.

If, at decision block 504, the cryptographic controller 404 determines that the requested data is encrypted, then the cache data read example 500 can proceed to block 506. At block 506, the cryptographic controller 404 can determine an encryption key for use with the data in the requested cache line. For example, the cryptographic controller 404 can read a key identifier from the key field 314 of the cache line and use the key identifier to look up an encryption key to use to decrypt the data from the cache line that is associated with the requested data. For example, the cryptographic controller 404 can obtain the encryption key from the key table 408.

At block 508, the cache data read example 500 can include decrypting cache data to plaintext. For example, block 508 can include using the first cryptographic engine 412, and the encryption key from block 506, to decrypt the information in the data field 304 of the cache line that includes the requested data. Then, at block 510, the first cryptographic engine 412 can provide the decrypted data or plaintext to the host that issued the request at block 502 or can write back the decrypted data to the cache memory 410. In an example, block 510 can include writing back the plaintext information in the data field 304 of the same cache line from the request at block 502, and can further include updating one or more fields in the cache line. For example, block 510 can include changing information in the encryption status field 310 to indicate the data in the cache line is not encrypted.

Figure 6:
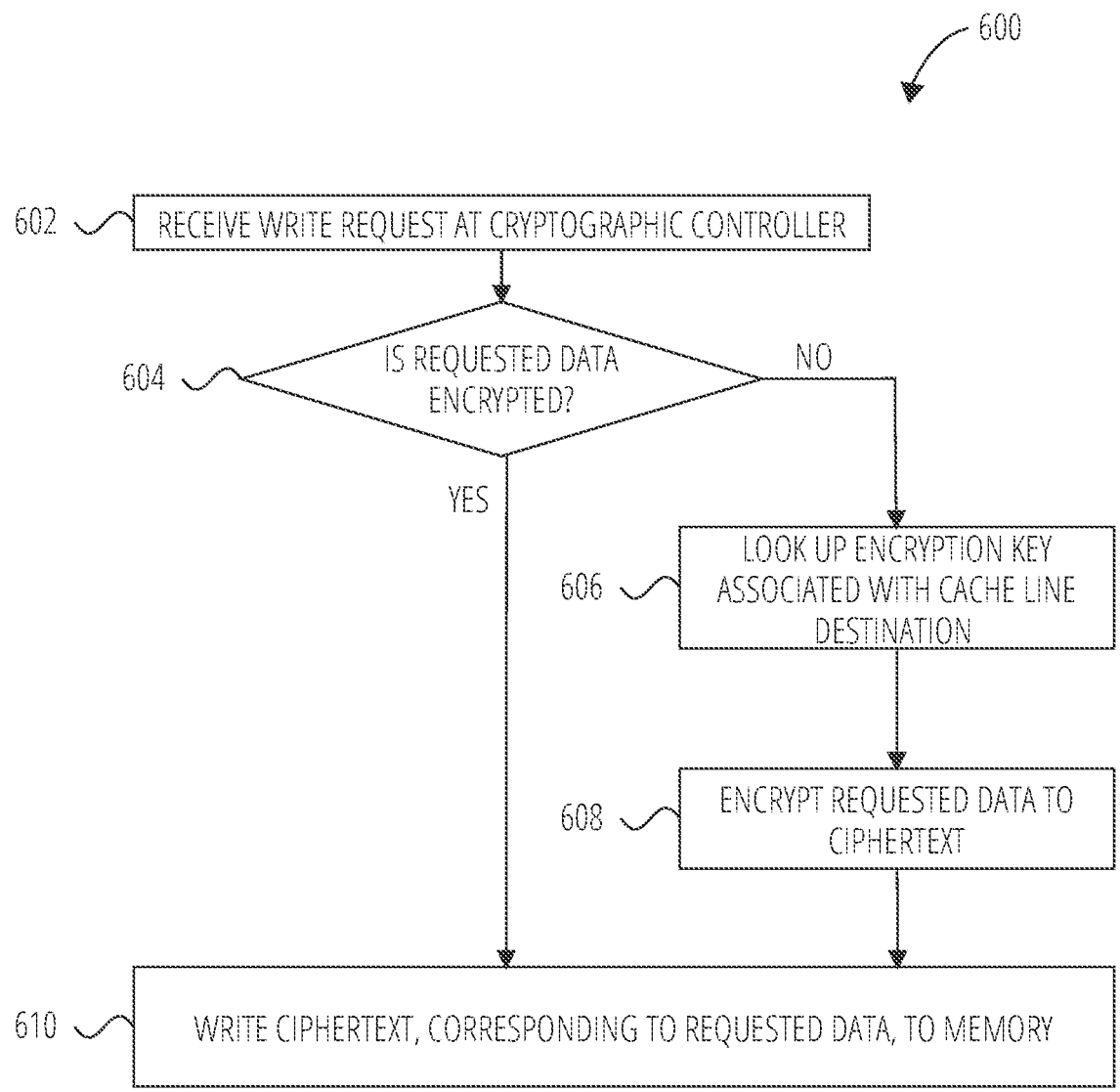
FIG. 6 illustrates generally an example of a cache data write example.

FIG. 6 illustrates generally an example of a cache data write example 600. The cache data write example 600 can include or use various components from the cryptographic memory system 400. At block 602, the cache data write example 600 includes receiving a write request at a cryptographic controller. For example, block 602 can include receiving a request, such as from a host device via the host interface 402, to write data to a particular cache line in the cache memory 410. In an example, the request from block 602 can be received by the cryptographic controller 404.

At decision block 604, the cryptographic controller 404 can determine whether the write request includes data that is encrypted or not encrypted. If, at decision block 604, the cryptographic controller 404 determines that the data is encrypted, then the cache data write example 600 can proceed to block 610. At block 610, the ciphertext or encrypted data, corresponding to the requested data, can be written to memory, such as to the cache memory 410.

If, at decision block 604, the cryptographic controller 404 determines that the requested data is not encrypted, then the cache data write example 600 can proceed to block 606. At block 606, the cryptographic controller 404 can determine an encryption key for use with the requested data at the destination cache line. For example, the cryptographic controller 404 can read a key identifier from the key field 314 of the destination cache line and use the key identifier to look up an encryption key to use to encrypt the data. For example, the cryptographic controller 404 can obtain the encryption key from the key table 408.

At block 608, the cache data write example 600 can include encrypting the requested data to ciphertext. For example, block 608 can include using the first cryptographic engine 412, and the encryption key from block 606, to encrypt the requested data. Then, at block 610, the first cryptographic engine 412 can write the encrypted data or ciphertext to the destination cache line in the cache memory 410. In an example, block 610 can include updating the encryption status field 310 to indicate the data in the cache line is encrypted.

In an example, block 608 can include or use the second cryptographic engine 416 to encrypt the requested data. If the second cryptographic engine 416 is used, then the cache data write example 600 can include, at block 610, writing the encrypted data to main memory using the memory controller 414. The encrypted data can be written to main memory together with its corresponding key identifier for later user.

Figure 7:
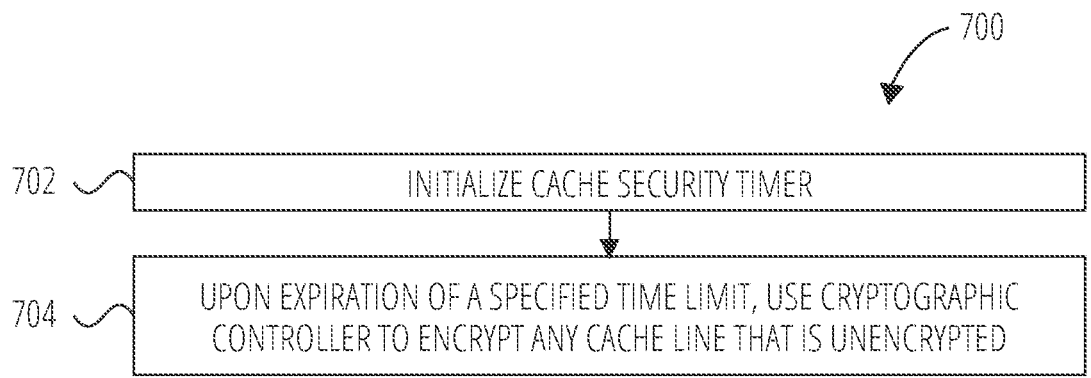
FIG. 7 illustrates generally an example of a cache timer method.

FIG. 7 illustrates generally an example for enhancing cache security in a cache memory that can include or use a cache timer method 700. At block 702, the cache timer method 700 can include initializing a cache security timer. The cache security timer can be configured to run at various rates and can optionally be referenced to a system clock or host processor interval counter, or to another internal or external reference.

At block 704, the cache timer method 700 can include monitoring the cache security timer for an expiration condition. Upon expiration of the cache security timer, the cryptographic controller 404 can scan all or a designated portion of the cache memory and identify any cache lines that are unencrypted. For example, the cryptographic controller 404 can search the cache memory for any lines with an encryption status field 310 that indicates information in the data field 304 is unencrypted. The cryptographic controller 404 can command the first cryptographic engine 412 to encrypt any lines that were identified as including unencrypted data. Following block 704, accesses to cache memory can be treated as initial access requests and any encrypted data can be decrypted in-place.

In the example of the cache timer method 700, cache lines in the cache memory can optionally omit the access counter 312 field, or the access counter 312 can be unused.

Figure 8:
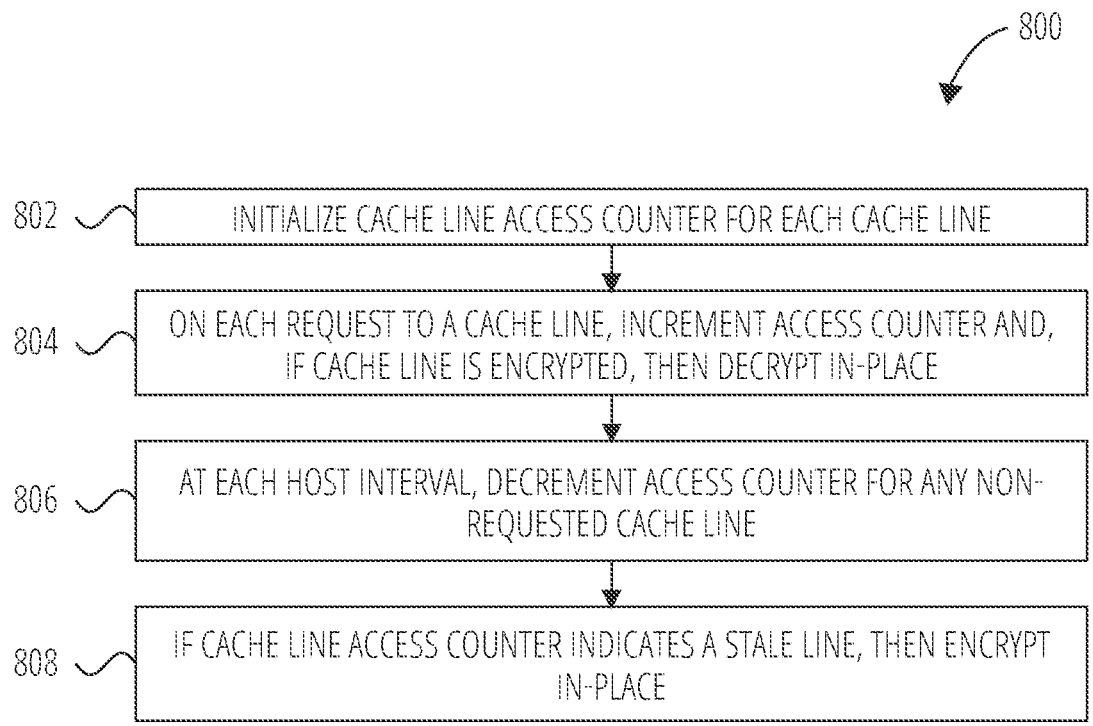
FIG. 8 illustrates generally an example of a cache access counter method.

FIG. 8 illustrates generally an example for enhancing cache security that can include or use a cache access counter method 800. At block 802, the cache access counter method 800 includes initializing a cache access counter 312 field in each cache line to include a counter value. For example, block 802 can include initializing one or multiple access counter 312 fields to have a reference value such as zero. The cryptographic controller 404 can optionally be configured to update or change the information in the access counter 312 fields of each cache line in the cache memory 410.

At block 804, the cache access counter method 800 can include, at each request for data from a particular cache line, incrementing a counter value stored in the access counter 312 of the particular cache line. In an example, block 804 can further include determining whether the particular cache line includes plaintext or ciphertext. If the particular cache line includes ciphertext, then block 804 can include decrypting the ciphertext in-place and writing back plaintext into the data field 304 of the particular cache line. Decrypting ciphertext can include or use the first cryptographic engine 412.

At block 806, the cache access counter method 800 can include decrementing a counter value for each cache line that is not accessed during a host interval. That is, for any non-requested cache line, the counter value in its respective access counter 312 field can be decremented or otherwise updated by the cryptographic controller 404 to indicate non-use of the data.

At block 808, the cache access counter method 800 can include selectively encrypting cache data for any cache line with a counter value that indicates a stale line. For example, block 808 can include using the cryptographic controller 404 to determine whether a counter value for a particular line meets or exceeds a specified threshold counter value. If the counter value is zero, for example, then the data can be determined to be infrequently accessed and, accordingly, can be sent for encryption or re-encryption. In an example, data designated for encryption can be encrypted using the first cryptographic engine 412 and written back in-place in the cache memory 410.

In an example, the cache timer method 700 and the cache access counter method 800 can be used together. For example, a memory controller-level timer can be used to intermittently, or periodically, review all cache contents and encrypt any unencrypted information in the cache memory 410, such as according to the cache timer method 700. Concurrently, or at a different or more frequent interval, the cache access counter method 800 can be used to monitor cache line accesses and selectively encrypt any unencrypted cache lines that meet a specified encryption or re-encryption criteria.

Figure 9:
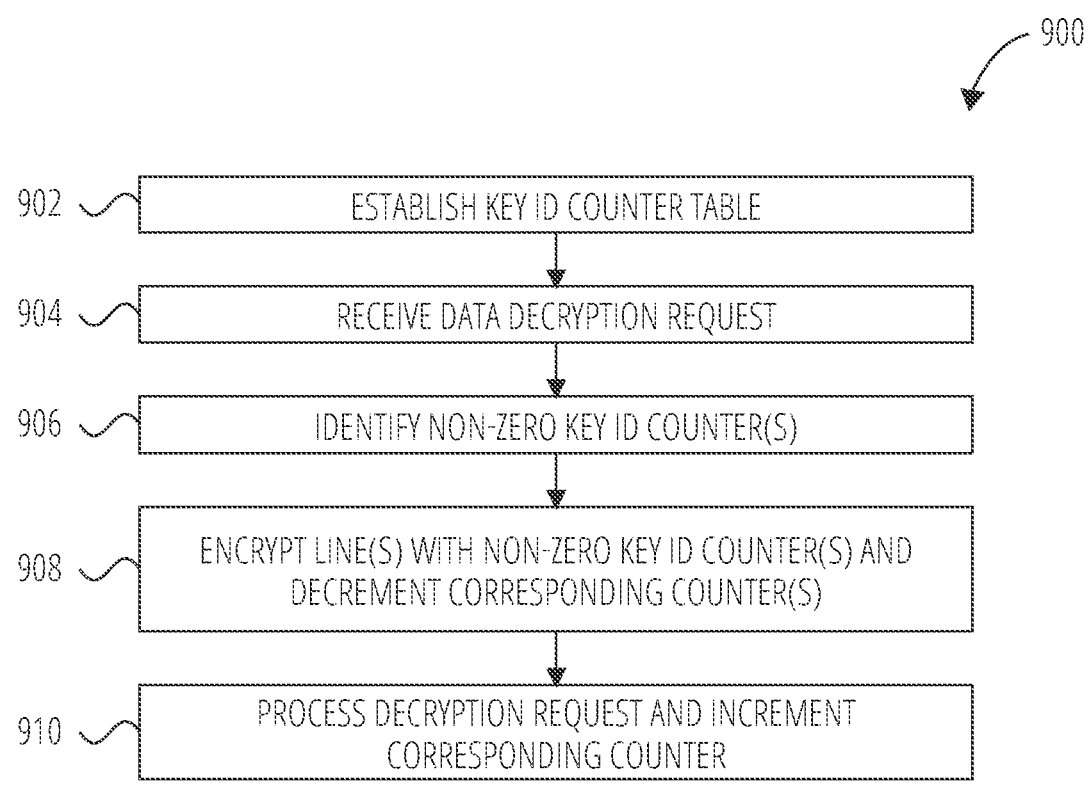
FIG. 9 illustrates generally an example of a cache encryption policy method.

FIG. 9 illustrates generally an example of an enhanced encryption policy method 900 that can include or use the cryptographic memory system 400. The encryption policy method 900 can help reduce or eliminate a risk of inadvertent access to an unencrypted cache line. The encryption policy method 900 can include or use hardware or software that is configured to identify unencrypted cache line data and force re-encryption of any unencrypted data having a different key identifier than pertains to a present or most recent request.

At block 902, the encryption policy method 900 can include establishing a key identifier counter table. The table can include a numerical counter corresponding to each key identifier in a cache. For example, the counter table can include a respective counter for each different key identifier in the key fields 314 of cache lines in the cache memory 410. The key identifier counter table can optionally be stored in the key table 216 or can be stored in the cache memory 410 or elsewhere. In an example, a counter for a particular key identifier can be initialized to a non-zero number or value when the corresponding cache line is filled with unencrypted data, or the counter can be initialized to zero or a null value when the corresponding cache line is filled with encrypted data.

At block 904, the encryption policy method 900 can include receiving a data decryption request. For example, block 904 can include receiving a read request, at the cryptographic controller 404 of the cryptographic memory system 400, for data corresponding to a particular key identifier. Notwithstanding an encryption status of the cache line (or of a data block comprising a portion of the cache line) that includes the requested data, the encryption policy method 900 can continue at block 906 with identifying any non-zero key identifier counters in the key identifier counter table. For example, block 906 can include identifying counter values corresponding to key identifiers, other than the particular key identifier from block 904, that are non-zero.

At block 908, following the identification of any non-zero counter at block 906, the encryption policy method 900 can include encrypting data associated with the identified non-zero counter or counters. In other words, block 908 can include encrypting data associated with any key identifier that is other than the particular key identifier from block 904 that corresponds to a present request. In an example, block 908 can further include decrementing the counter for any key identifier that corresponds to the encrypted or re-encrypted data. At block 910, the encryption policy method 900 can proceed with processing the data decryption request from block 904, and can further include incrementing the counter for the particular key identifier that corresponds to the decrypted data. Accordingly, using the encryption policy method 900, cache data corresponding to a present request, and having a single key identifier, can be unencrypted while other data in the cache is maintained securely encrypted.

FIG. 10A and FIG. 10B illustrate generally an example of a chiplet system that can be used to implement one or more aspects of the CNM system 102, the memory subsystem 200, or the cryptographic memory system 400. As similarly mentioned above, a node in the CNM system 102, or a device within a node in the CNM system 102, or the cryptographic memory system 400, can include a chiplet-based architecture or compute-near-memory (CNM) chiplet. A packaged memory-compute device can include, for example, one, two, or four CNM chiplets. The chiplets can be interconnected using high-bandwidth, low-latency interconnects such as using a CPI interface. Generally, a chiplet system is made up of discrete modules (each a "chiplet") that are integrated on an interposer and, in many examples, are interconnected as desired through one or more established networks to provide a system with the desired functionality. The interposer and included chiplets can be packaged together to facilitate interconnection with other components of a larger system. Each chiplet can include one or more individual integrated circuits (ICs), or "chips," potentially in combination with discrete circuit components, and can be coupled to a respective substrate to facilitate attachment to the interposer. Most or all chiplets in a system can be individually configured for communication through established networks.

The configuration of chiplets as individual modules of a system is distinct from such a system being implemented on single chips that contain distinct device blocks (e.g., intellectual property (IP) blocks) on one substrate (e.g., single die), such as a system-on-a-chip (SoC), or multiple discrete packaged devices integrated on a printed circuit board (PCB). In general, chiplets provide better performance (e.g., lower power consumption, reduced latency, etc.) than discrete packaged devices, and chiplets provide greater production benefits than single die chips. These production benefits can include higher yields or reduced development costs and time.

Chiplet systems can include, for example, one or more application (or processor) chiplets and one or more support chiplets. Here, the distinction between application and support chiplets is simply a reference to the likely design scenarios for the chiplet system. Thus, for example, a synthetic vision chiplet system can include, by way of example only, an application chiplet to produce the synthetic vision output along with support chiplets, such as a memory controller chiplet, such as can comprise the cryptographic memory system 400, a sensor interface chiplet, or a communication chiplet. In a typical use case, the synthetic vision designer can design the application chiplet and source the support chiplets from other parties. Thus, the design expenditure (e.g., in terms of time or complexity) is reduced because by avoiding the design and production of functionality embodied in the support chiplets.

Chiplets also support the tight integration of IP blocks that can otherwise be difficult, such as those manufactured using different processing technologies or using different feature sizes (or utilizing different contact technologies or spacings). Thus, multiple ICs or IC assemblies, with different physical, electrical, or communication characteristics can be assembled in a modular manner to provide an assembly with various desired functionalities or levels of security. Chiplet systems can also facilitate adaptation to suit needs of different larger systems into which the chiplet system will be incorporated. In an example, ICs or other assemblies can be optimized for the security, power, speed, or heat generation for a specific function and can be integrated with other devices more easily than, e.g., using a single die. Additionally, by reducing the overall size of the die, the yield for chiplets tends to be higher than that of more complex, single die devices.

FIG. 10A and FIG. 10B illustrate generally an example of a chiplet system, according to an embodiment. FIG. 10A is a representation of the chiplet system 1002 mounted on a peripheral board 1004, that can be connected to a broader computer system by a peripheral component interconnect express (PCIe), for example. The chiplet system 1002 includes a package substrate 1006, an interposer 1008, and four chiplets, an application chiplet 1010, a host interface chiplet 1012, a memory controller chiplet 1014, and a memory device chiplet 1016. Other systems can include many additional chiplets to provide additional functionalities as will be apparent from the following discussion. The package of the chiplet system 1002 is illustrated with a lid or cover 1018, though other packaging techniques and structures for the chiplet system can be used. FIG. 10B is a block diagram labeling the components in the chiplet system for clarity.

The application chiplet 1010 is illustrated as including a chiplet system NOC 1020 to support a chiplet network 1022 for inter-chiplet communications. In example embodiments the chiplet system NOC 1020 can be included on the application chiplet 1010. In an example, the first NOC 118 from the example of FIG. 1 can be defined in response to selected support chiplets (e.g., host interface chiplet 1012, memory controller chiplet 1014, and memory device chiplet 1016) thus enabling a designer to select an appropriate number or chiplet network connections or switches for the chiplet system NOC 1020. In an example, the chiplet system NOC 1020 can be located on a separate chiplet, or within the interposer 1008. In examples as discussed herein, the chiplet system NOC 1020 implements a chiplet protocol interface (CPI) network. In an example, the chiplet system 1002 can include or comprise a portion of the cryptographic memory system 400. That is, the various blocks or components of the cryptographic memory system 400 can include chiplets that can be mounted on the peripheral board 1004, the package substrate 1006, and the interposer 1008.

The CPI interface, such as can be used for communication between or among chiplets in a system, is a packet-based network that supports virtual channels to enable a flexible and high-speed interaction between chiplets. CPI enables bridging from intra-chiplet networks to the chiplet network 1022. For example, the Advanced eXtensible Interface (AXI) is a widely used specification to design intra-chip communications. AXI specifications, however, cover a great variety of physical design options, such as the number of physical channels, signal timing, power, etc. Within a single chip, these options are generally selected to meet design goals, such as power consumption, speed, etc. However, to achieve the flexibility of the chiplet system, an adapter, such as CPI, is used to interface between the various AXI design options that can be implemented in the various chiplets. By enabling a physical channel to virtual channel mapping and encapsulating time-based signaling with a packetized protocol, CPI bridges intra-chiplet networks across the chiplet network 1022.

CPI can use a variety of different physical layers to transmit packets. The physical layer can include simple conductive connections, or can include drivers to increase the voltage, or otherwise facilitate transmitting the signals over longer distances. An example of one such a physical layer can include the Advanced Interface Bus (AIB), which in various examples, can be implemented in the interposer 1008. AIB transmits and receives data using source synchronous data transfers with a forwarded clock. Packets are transferred across the AIB at single data rate (SDR) or dual data rate (DDR) with respect to the transmitted clock. Various channel widths are supported by AIB. The channel can be configured to have a symmetrical number of transmit (TX) and receive (RX) input/outputs (I/Os), or have a non-symmetrical number of transmitters and receivers (e.g., either all transmitters or all receivers). The channel can act as an AIB principal or subordinate depending on which chiplet provides the principal clock. AIB I/O cells support three clocking modes: asynchronous (i.e. non-clocked), SDR, and DDR. In various examples, the non-clocked mode is used for clocks and some control signals. The SDR mode can use dedicated SDR only I/O cells, or dual use SDR/DDR I/O cells.

In an example, CPI packet protocols (e.g., point-to-point or routable) can use symmetrical receive and transmit I/O cells within an AIB channel. The CPI streaming protocol allows more flexible use of the AIB I/O cells. In an example, an AIB channel for streaming mode can configure the I/O cells as all TX, all RX, or half TX and half RX. CPI packet protocols can use an AIB channel in either SDR or DDR operation modes. In an example, the AIB channel is configured in increments of 80 I/O cells (i.e. 40 TX and 40 RX) for SDR mode and 40 I/O cells for DDR mode. The CPI streaming protocol can use an AIB channel in either SDR or DDR operation modes. Here, in an example, the AIB channel is in increments of 40 I/O cells for both SDR and DDR modes. In an example, each AIB channel is assigned a unique interface identifier. The identifier is used during CPI reset and initialization to determine paired AIB channels across adjacent chiplets. In an example, the interface identifier is a 20-bit value comprising a seven-bit chiplet identifier, a seven-bit column identifier, and a six-bit link identifier. The AIB physical layer transmits the interface identifier using an AIB out-of-band shift register. The 20-bit interface identifier is transferred in both directions across an AIB interface using bits 32-51 of the shift registers.

AIB defines a stacked set of AIB channels as an AIB channel column. An AIB channel column has some number of AIB channels, plus an auxiliary channel. The auxiliary channel contains signals used for AIB initialization. All AIB channels (other than the auxiliary channel) within a column are of the same configuration (e.g., all TX, all RX, or half TX and half RX, as well as having the same number of data I/O signals). In an example, AIB channels are numbered in continuous increasing order starting with the AIB channel adjacent to the AUX channel. The AIB channel adjacent to the AUX is defined to be AIB channel zero.

Generally, CPI interfaces on individual chiplets can include serialization-deserialization (SERDES) hardware. SERDES interconnects work well for scenarios in which high-speed signaling with low signal count are desirable. SERDES, however, can result in additional power consumption and longer latencies for multiplexing and demultiplexing, error detection or correction (e.g., using block level cyclic redundancy checking (CRC)), link-level retry, or forward error correction. However, when low latency or energy consumption is a primary concern for ultra-short reach, chiplet-to-chiplet interconnects, a parallel interface with clock rates that allow data transfer with minimal latency can be utilized. CPI includes elements to minimize both latency and energy consumption in these ultra-short reach chiplet interconnects.

For flow control, CPI employs a credit-based technique. A recipient, such as the application chiplet 1010, provides a sender, such as the memory controller chiplet 1014, with credits that represent available buffers. In an example, a CPI recipient includes a buffer for each virtual channel for a given time-unit of transmission. Thus, if the CPI recipient supports five messages in time and a single virtual channel, the recipient has five buffers arranged in five rows (e.g., one row for each unit time). If four virtual channels are supported, then the recipient has twenty buffers arranged in five rows. Each buffer holds the payload of one CPI packet.

When the sender transmits to the recipient, the sender decrements the available credits based on the transmission. Once all credits for the recipient are consumed, the sender stops sending packets to the recipient. This ensures that the recipient always has an available buffer to store the transmission.

As the recipient processes received packets and frees buffers, the recipient communicates the available buffer space back to the sender. This credit return can then be used by the sender allow transmitting of additional information.

The example of FIG. 10A includes a chiplet mesh network 1024 that uses a direct, chiplet-to-chiplet technique without a need for the chiplet system NOC 1020. The chiplet mesh network 1024 can be implemented in CPI, or another chiplet-to-chiplet protocol. The chiplet mesh network 1024 generally enables a pipeline of chiplets where one chiplet serves as the interface to the pipeline while other chiplets in the pipeline interface only with themselves.

Additionally, dedicated device interfaces, such as one or more industry standard memory interfaces (such as, for example, synchronous memory interfaces, such as DDR5, DDR6), can be used to connect a device to a chiplet. Connection of a chiplet system or individual chiplets to external devices (such as a larger system can be through a desired interface (for example, a PCIe interface). Such an external interface can be implemented, in an example, through the host interface chiplet 1012, which in the depicted example, provides a PCIe interface external to chiplet system. Such dedicated chiplet interfaces 1026 are generally employed when a convention or standard in the industry has converged on such an interface. The illustrated example of a Double Data Rate (DDR) interface connecting the memory controller chiplet 1014 to a dynamic random access memory (DRAM) memory device chiplet 1016 is just such an industry convention.

Of the variety of possible support chiplets, the memory controller chiplet 1014 is likely present in the chiplet system due to the near omnipresent use of storage for computer processing as well as sophisticated state-of-the-art for memory devices. Thus, using memory device chiplets 1016 and memory controller chiplets 1014 produced by others gives chiplet system designers access to robust products by sophisticated producers. Generally, the memory controller chiplet 1014 provides a memory device-specific interface to read, write, or erase data. In some examples, the memory controller chiplet 1014 can provide additional features, such as selective encryption or decryption, error detection, error correction, maintenance operations, or atomic operator execution. For some types of memory, maintenance operations tend to be specific to the memory device chiplet 1016, such as garbage collection in NAND flash or storage class memories, temperature adjustments (e.g., cross temperature management) in NAND flash memories. In an example, the maintenance operations can include logical-to-physical (L2P) mapping or management to provide a level of indirection between the physical and logical representation of data. In other types of memory, for example DRAM, some memory operations, such as refresh can be controlled by a host processor or of a memory controller at some times, and at other times controlled by the DRAM memory device, or by logic associated with one or more DRAM devices, such as an interface chip (in an example, a buffer).

Atomic operators are a data manipulation that, for example, can be performed by the memory controller chiplet 1014. In other chiplet systems, the atomic operators can be performed by other chiplets. For example, an atomic operator of "increment" can be specified in a command by the application chiplet 1010, the command including a memory address and possibly an increment value. Upon receiving the command, the memory controller chiplet 1014 retrieves a number from the specified memory address, increments the number by the amount specified in the command, and stores the result. Upon a successful completion, the memory controller chiplet 1014 provides an indication of the command success to the application chiplet 1010. Atomic operators avoid transmitting the data across the chiplet mesh network 1024, resulting in lower latency execution of such commands.

Atomic operators can be classified as built-in atomics or programmable (e.g., custom) atomics. Built-in atomics are a finite set of operations that are immutably implemented in hardware. Programmable atomics are small programs that can execute on a programmable atomic unit (PAU) (e.g., a custom atomic unit (CAU)) of the memory controller chiplet 1014.

The memory device chiplet 1016 can be, or include any combination of, volatile memory devices or non-volatile memories. Examples of volatile memory devices include, but are not limited to, random access memory (RAM)—such as DRAM) synchronous DRAM (SDRAM), graphics double data rate type 6 SDRAM (GDDR6 SDRAM), among others. Examples of non-volatile memory devices include, but are not limited to, negative-and-(NAND)-type flash memory, storage class memory (e.g., phase-change memory or memristor based technologies), ferroelectric RAM (FeRAM), among others. The illustrated example includes the memory device chiplet 1016 as a chiplet, however, the device can reside elsewhere, such as in a different package on the peripheral board 1004. For many applications, multiple memory device chiplets can be provided. In an example, these memory device chiplets can each implement one or multiple storage technologies, and may include integrated compute hosts. In an example, a memory chiplet can include, multiple stacked memory die of different technologies, for example one or more static random access memory (SRAM) devices stacked or otherwise in communication with one or more dynamic random access memory (DRAM) devices. In an example, the memory controller chiplet 1014 can serve to coordinate operations between multiple memory chiplets in the chiplet system 1002, for example, to use one or more memory chiplets in one or more levels of cache storage, and to use one or more additional memory chiplets as main memory. The chiplet system 1002 can include multiple memory controller chiplet 1014 instances, as can be used to provide memory control functionality for separate hosts, processors, sensors, networks, etc. A chiplet architecture, such as in the illustrated system, offers advantages in allowing adaptation to different memory storage technologies; and different memory interfaces, through updated chiplet configurations, such as without requiring redesign of the remainder of the system structure.

Figure 11:
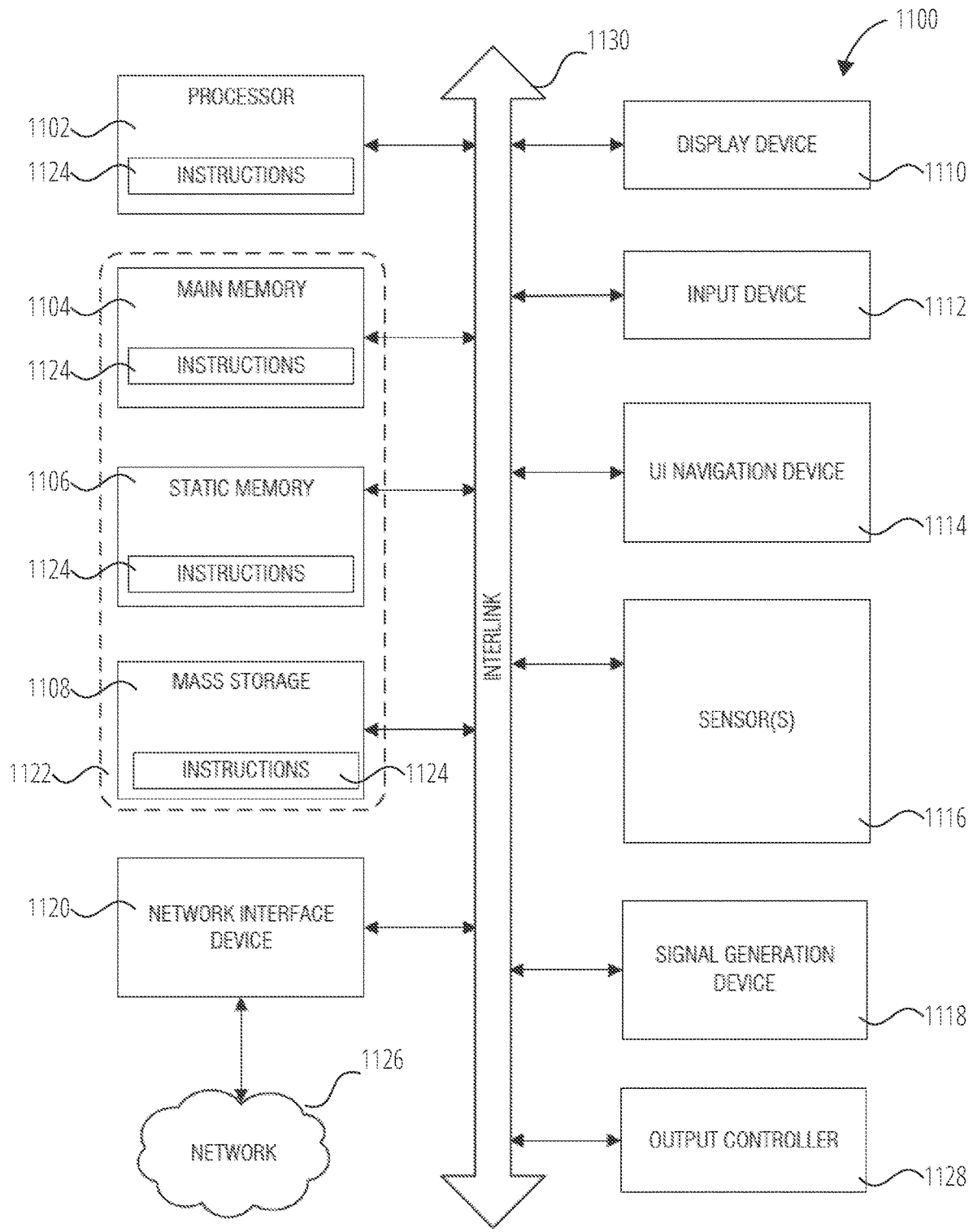
FIG. 11 illustrates a block diagram of an example machine with which, in which, or by which any one or more of the techniques (e.g., methodologies) discussed herein can be implemented.

FIG. 11 illustrates a block diagram of an example machine 1100 with which, in which, or by which any one or more of the techniques (e.g., methodologies) discussed herein can be implemented. Examples, as described herein, can include, or can operate by, logic or a number of components, or mechanisms in the machine 1100. Circuitry (e.g., processing circuitry) is a collection of circuits implemented in tangible entities of the machine 1100 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired), such as to facilitate encryption or decryption of cache data. In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time.

In some embodiments, the machine 1100 can operate as a standalone device or can be connected (e.g., networked) to other machines. In a networked deployment, the machine 1100 can operate in the capacity of a server machine, a client machine, or both in server-client network environments. In an example, the machine 1100 can act as a peer machine in peer-to-peer (P2P) (or other distributed) network environment. The machine 1100 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine 1100 (e.g., computer system) can include a hardware processor 1102 (e.g., a central processing unit (CPU), a graphics processing unit (GPU), a hardware processor core, or any combination thereof), a main memory 1104, a static memory 1106 (e.g., memory or storage for firmware, microcode, a basic-input-output (BIOS), unified extensible firmware interface (UEFI), etc.), and mass storage device 1108 (e.g., hard drives, tape drives, flash storage, or other block devices) some or all of which can communicate with each other via an interlink 1130 (e.g., bus). The machine 1100 can further include a display device 1110, an alphanumeric input device 1112 (e.g., a keyboard), and a user interface (UI) Navigation device 1114 (e.g., a mouse). In an example, the display device 1110, the input device 1112, and the UI navigation device 1114 can be a touch screen display. The machine 1100 can additionally include a mass storage device 1108 (e.g., a drive unit), a signal generation device 1118 (e.g., a speaker), a network interface device 1120, and one or more sensor(s) 1116, such as a global positioning system (GPS) sensor, compass, accelerometer, or other sensor. The machine 1100 can include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the hardware processor 1102, the main memory 1104, the static memory 1106, or the mass storage device 1108 can be, or include, a machine-readable media 1122 on which is stored one or more sets of data structures or instructions 1124 (e.g., software) embodying or used by any one or more of the techniques or functions described herein. The instructions 1124 can also reside, completely or at least partially, within any of registers of the hardware processor 1102, the main memory 1104, the static memory 1106, or the mass storage device 1108 during execution thereof by the machine 1100. In an example, one or any combination of the hardware processor 1102, the main memory 1104, the static memory 1106, or the mass storage device 1108 can constitute the machine-readable media 1122. While the machine-readable media 1122 is illustrated as a single medium, the term "machine-readable medium" can include a single medium or multiple media (e.g., a centralized or distributed database, or associated caches and servers) configured to store the one or more instructions 1124.

The term "machine readable medium" can include any medium that is capable of storing, encoding, or carrying instructions for execution by the machine 1100 and that cause the machine 1100 to perform any one or more of the techniques of the present disclosure, or that is capable of storing, encoding or carrying data structures used by or associated with such instructions. Non-limiting machine-readable medium examples can include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., electrically programmable read-only memory (EPROM), electrically erasable programmable read-only memory (EEPROM)) and flash memory devices; magnetic disks, such as internal hard disks and removable disks; magneto-optical disks; and CD-ROM and DVD-ROM disks.

In an example, information stored or otherwise provided on the machine-readable media 1122 can be representative of the instructions 1124, such as instructions 1124 themselves or a format from which the instructions 1124 can be derived. This format from which the instructions 1124 can be derived can include source code, encoded instructions (e.g., in compressed or encrypted form), packaged instructions (e.g., split into multiple packages), or the like. The information representative of the instructions 1124 in the machine-readable media 1122 can be processed by processing circuitry into the instructions to implement any of the operations discussed herein. For example, deriving the instructions 1124 from the information (e.g., processing by the processing circuitry) can include: compiling (e.g., from source code, object code, etc.), interpreting, loading, organizing (e.g., dynamically or statically linking), encoding, decoding, encrypting, unencrypting, decrypting, packaging, unpackaging, or otherwise manipulating the information into the instructions 1124.

In an example, the derivation of the instructions 1124 can include assembly, compilation, or interpretation of the information (e.g., by the processing circuitry) to create the instructions 1124 from some intermediate or preprocessed format provided by the machine-readable media 1122. The information, when provided in multiple parts, can be combined, unpacked, and modified to create the instructions 1124. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 1124 can be further transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), plain old telephone (POTS) networks, and wireless data networks (e.g., Institute of Electrical and Electronics Engineers (IEEE) 402.11 family of standards known as Wi-Fi®, IEEE 402.16 family of standards known as) WiMax®), IEEE 402.15.4 family of standards, peer-to-peer (P2P) networks, among others. In an example, the network interface device 1120 can include one or more physical jacks (e.g., Ethernet, coaxial, or phone jacks) or one or more antennas to connect to the network 1126. In an example, the network interface device 1120 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1100, and includes digital or analog communications signals or other intangible medium to facilitate communication of such software. A transmission medium is a machine-readable medium.

To better illustrate the methods and apparatuses described herein, a non-limiting set of Example embodiments are set forth below as numerically identified Examples.

Example 1 can include a method comprising: maintaining, in a cache memory, multiple cache lines, wherein each cache line comprises a data field, an encryption status attribute, and an encryption key attribute. In Example 1, the encryption status attribute indicates whether the data field in the corresponding cache line includes, encrypted or unencrypted data, and the encryption key attribute includes an encryption key identifier for the corresponding cache line.

In Example 2, the subject matter of Example 1 includes maintaining the multiple cache lines and optionally further comprises maintaining, for each cache line, a respective access counter that indicates an access history for the corresponding cache line.

In Example 3, the subject matter of Example 2 can include incrementing the access counter for a first cache line when a host accesses the first cache line.

In Example 4, the subject matter of Examples 2-3 can include decrementing the access counter for a first cache line when a compute interval of a host elapses without accessing the first cache line.

In Example 5, the subject matter of Examples 2-4 can include selectively evicting cache lines based on respective values of the access counters for the cache lines.

In Example 6, the subject matter of Example 5 optionally includes, for selectively evicting cache lines, evicting a first cache line having an unencrypted first data field, including preparing evicted data by encrypting the first data field using an encryption key identified by the encryption key attribute of the first cache line, and writing the evicted data to an external memory.

In Example 7, the subject matter of Examples 1-6 can include or use each of multiple ones of the cache lines associated with a respective different encryption key.

In Example 8, the subject matter of Examples 1-7 can include maintaining a key table, the key table including encryption keys corresponding to multiple encryption key identifiers. Example 8 can include using a cryptographic controller for retrieving an encryption key to enable encryption or decryption of data in at least one of the cache lines.

In Example 9, the subject matter of Examples 1-8 can include establishing respective key identifier counters for multiple encryption key identifiers used by the cache memory, and selectively encrypting at least a portion of any cache line data associated with a non-null key identifier counter.

In Example 10, the subject matter of Example 9 optionally includes decrementing the key identifier counter corresponding to the selectively encrypted cache line data.

In Example 11, the subject matter of Examples 9 or 10 optionally includes receiving a data decryption request and incrementing the key identifier counter for the cache line data corresponding to the request.

In Example 12, the subject matter of Examples 9-11 optionally includes using information from the key identifier counters to provide or enforce a data security policy that allows decryption or storage of plaintext information corresponding to a single key identifier while maintaining encryption or storage of ciphertext information corresponding to all other key identifiers used by the cache memory.

Example 13 includes a method comprising using a cryptographic controller for reading a first cache line from a cache memory and identifying an encryption status attribute in the first cache line. When the encryption status attribute indicates the first cache line comprises encrypted data, Example 13 includes accessing a first encryption key from a key table, the first encryption key identified by an encryption key attribute from the first cache line and decrypting at least a portion of the encrypted data from the first cache line to provide first decrypted data, and providing the first decrypted data to a host. When the encryption status attribute indicates the first cache line comprises first unencrypted data, Example 13 includes providing the first unencrypted data to the host.

In Example 14, the subject matter of Example 13 can include, in response to providing the first decrypted data to the host, receiving, at the cryptographic controller, processed data from the host, and encrypting the processed data using the first encryption key to provide encrypted dirty data, and writing, to the first cache line, the encrypted dirty data together with the encryption key attribute.

In Example 15, the subject matter of Example 14 can include writing the encrypted dirty data to the first cache line further comprising updating an access counter that indicates an access history for the first cache line.

In Example 16, the subject matter of Examples 13-15 can include, in response to providing the first unencrypted data to the host, receiving, at the cryptographic controller, processed data from the host, and writing, to the first cache line, the processed data together with the encryption key attribute.

In Example 17, the subject matter of Example 16 can include updating an access counter that indicates an access history for the first cache line.

In Example 18, the subject matter of Example 17 can include encrypting the processed data in the first cache when the access counter indicates an access frequency that meets a specified threshold access condition, and encrypting the processed data includes using the first encryption key.

Example 19 can include a system comprising: a cache memory comprising multiple cache lines, wherein each cache line comprises a data field, an encryption status attribute that indicates whether the data field comprises encrypted data, and an encryption key attribute that indicates a particular encryption key, from among multiple encryption keys, that is associated with the cache line or with the data in the data field. Example 19 can further include a cryptographic controller circuit configured to receive a read and/or write request from a host device and, in response, retrieve a first cache line from the cache memory. When the encryption status attribute indicates the first cache line includes encrypted data, then the cryptographic controller can decrypt information from the data field of the first cache line, using a key indicated by the encryption key attribute from the first cache line, to provide first decrypted data and provide the first decrypted data to the host device, and optionally receive an unencrypted first response data from the host device, and encrypt the first response data, using the same key indicated by the encryption key attribute from the first cache line, to provide an updated data field, and write the updated data field to the first cache line.

In Example 20, the subject matter of Example 19 can include or use the cryptographic controller further configured to retrieve a second cache line from the cache memory and when the encryption status attribute of the second cache line indicates the second cache line includes unencrypted data, provide the unencrypted data to the host device, receive unencrypted second response data from the host device, and determine whether to write back the second response data to the second cache line or to encrypt the second response data.

In Example 21, the subject matter of Example 20 can include or use the cryptographic controller to determine whether to write back or encrypt the second response data based on a cache line access counter for the second cache line.

In Example 22, the subject matter of Examples 19-21 can include or use a key table configured to maintain the multiple encryption keys and associated encryption key attributes for the multiple cache lines in the cache memory.

In Example 23, the subject matter of Examples 19-22 can include a write-back encryption engine coupled to the cache memory and a main memory, and the encryption engine can be configured to encrypt any unencrypted data written from the cache memory to a main memory.

In Example 24, the subject matter of Examples 19-23 can include cache lines in the cache memory comprising respective cache line access counters configured to indicate a relative age of the data in the cache lines. In Example 24, the cryptographic controller circuit can be configured to increment or decrement the cache line access counters at each cycle of the host device.

Example 25 is at least one machine-readable medium including instructions that, when executed by processing circuitry, cause the processing circuitry to perform operations to implement of any of Examples 1-24.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method comprising:
    maintaining, in a cache memory, multiple cache lines, wherein each cache line comprises a data field, an encryption status attribute, and an encryption key attribute;
    wherein the encryption status attribute indicates whether the data field in the corresponding cache line includes encrypted or unencrypted data, and
    wherein the encryption key attribute includes an encryption key identifier for the corresponding cache line.

2. The method of claim 1, wherein maintaining the multiple cache lines further comprises maintaining, for each cache line, a respective access counter that indicates an access history for the corresponding cache line.

3. The method of claim 2, further comprising one of:
incrementing the access counter for a first cache line when a host accesses the first cache line; or
decrementing the access counter for a first cache line when a compute interval of a host elapses without accessing the first cache line.

4. The method of claim 2, further comprising selectively evicting cache lines based on respective values of the access counters for the cache lines.

5. The method of claim 4, wherein selectively evicting cache lines includes:
evicting a first cache line having an unencrypted first data field, including preparing evicted data by encrypting the first data field using an encryption key identified by the encryption key attribute of the first cache line, and writing the evicted data to an external memory.

6. The method of claim 1, wherein each of multiple ones of the cache lines is associated with a respective different encryption key.

7. The method of claim 1, further comprising maintaining a key table, the key table including encryption keys corresponding to multiple encryption key identifiers; and
using a cryptographic controller, retrieving an encryption key to enable encryption or decryption of data in at least one of the cache lines.

8. The method of claim 1, further comprising:
establishing respective key identifier counters for multiple encryption key identifiers used by the cache memory; and
selectively encrypting at least a portion of any cache line data associated with a non-null key identifier counter.

9. The method of claim 8, wherein selectively encrypting the cache line data includes decrementing the key identifier counter corresponding to the selectively encrypted cache line data.

10. The method of claim 9, further comprising receiving a data decryption request and incrementing the key identifier counter for the cache line data corresponding to the request.

11. The method of claim 8, further comprising using information from the key identifier counters to enforce a data security policy that allows decryption or storage of plaintext information corresponding to a single key identifier while maintaining encryption or storage of ciphertext information corresponding to all other key identifiers used by the cache memory.

12. A method comprising:
using a cryptographic controller:
reading a first cache line from a cache memory;
identifying an encryption status attribute in the first cache line;
when the encryption status attribute indicates the first cache line comprises encrypted data:
accessing a first encryption key from a key table, the first encryption key identified by an encryption key attribute from the first cache line;
decrypting at least a portion of the encrypted data from the first cache line to provide first decrypted data; and
providing the first decrypted data to a host; and
when the encryption status attribute indicates the first cache line comprises first unencrypted data:
providing the first unencrypted data to the host.

13. The method of claim 12, further comprising:
in response to providing the first decrypted data to the host, receiving, at the cryptographic controller, processed data from the host;
encrypting the processed data using the first encryption key to provide encrypted dirty data; and
writing, to the first cache line, the encrypted dirty data together with the encryption key attribute.

14. The method of claim 13, wherein writing the encrypted dirty data to the first cache line further comprises updating an access counter that indicates an access history for the first cache line.

15. The method of claim 12, further comprising:
in response to providing the first unencrypted data to the host, receiving, at the cryptographic controller, processed data from the host;
writing, to the first cache line, the processed data together with the encryption key attribute;
updating an access counter that indicates an access history for the first cache line; and
encrypting the processed data in the first cache when the access counter indicates an access frequency that meets a specified threshold access condition, wherein encrypting the processed data includes using the first encryption key.

16. A system comprising:
a cache memory comprising multiple cache lines, wherein each cache line comprises a data field, an encryption status attribute that indicates whether the data field comprises encrypted data, and an encryption key attribute that indicates a particular encryption key, from among multiple encryption keys, that is associated with the cache line or with the data in the data field; and
a cryptographic controller circuit configured to receive a read and/or write request from a host device and, in response:
retrieve a first cache line from the cache memory;
when the encryption status attribute indicates the first cache line includes encrypted data, decrypt information from the data field of the first cache line, using a key indicated by the encryption key attribute from the first cache line, to provide first decrypted data;
provide the first decrypted data to the host device;
receive unencrypted first response data from the host device; and
encrypt the first response data, using the same key indicated by the encryption key attribute from the first cache line, to provide an updated data field; and
write the updated data field to the first cache line.

17. The system of claim 16, wherein the cryptographic controller is further configured to:
retrieve a second cache line from the cache memory;
when the encryption status attribute of the second cache line indicates the second cache line includes unencrypted data, provide the unencrypted data to the host device;
receive unencrypted second response data from the host device; and
determine whether to write back the second response data to the second cache line or to encrypt the second response data;
wherein the cryptographic controller is configured to determine whether to write back or encrypt the second response data based on a cache line access counter for the second cache line.

18. The system of claim 16, further comprising:
a key table configured to maintain the multiple encryption keys and associated encryption key attributes for the multiple cache lines in the cache memory.

19. The system of claim 16, further comprising a write-back encryption engine coupled to the cache memory and a main memory, wherein the encryption engine is configured to encrypt any unencrypted data written from the cache memory to a main memory.

20. The system of claim 16, wherein cache lines in the cache memory comprise respective cache line access counters configured to indicate a relative age of the data in the cache lines; and wherein the cryptographic controller circuit is configured to increment or decrement the cache line access counters at each cycle of the host device.

* * * * *